US012667109B2

(12) United States Patent
Jacobson

(10) Patent No.: US 12,667,109 B2
(45) Date of Patent: *Jun. 30, 2026

(54) MULTI-LAYERED FOOD PRODUCT AND METHOD FOR FORMING

(71) Applicant: Arlington Valley Farms LLC, Hudson, OH (US)

(72) Inventor: Peter Jacobson, Cleveland, OH (US)

(73) Assignee: Arlington Valley Farms LLC, Hudson, OH (US)

( * ) Notice: Subject to any disclaimer, the term of this patent is extended or adjusted under 35 U.S.C. 154(b) by 242 days.

This patent is subject to a terminal disclaimer.

(21) Appl. No.: 18/386,736

(22) Filed: Nov. 3, 2023

(65) Prior Publication Data

US 2024/0057621 A1     Feb. 22, 2024

Related U.S. Application Data

(60) Continuation of application No. 17/533,975, filed on Nov. 23, 2021, now Pat. No. 11,910,799, which is a continuation of application No. 16/708,644, filed on Dec. 10, 2019, now abandoned, which is a continuation-in-part of application No. 15/296,088, filed on Oct. 18, 2016, now Pat. No. 10,537,111, which is a division of application No. 13/419,505, filed on Mar. 14, 2012, now Pat. No. 10,448,653, which is a continuation-in-part of application No. 12/958,313, filed on Dec. 1, 2010, now Pat. No. 10,457,804.

(60) Provisional application No. 61/265,457, filed on Dec. 1, 2009.

(51) Int. Cl.

| | |
|---|---|
| *A21D 13/31* | (2017.01) |
| *A21C 11/08* | (2006.01) |
| *A21C 11/16* | (2006.01) |
| *A21D 8/06* | (2006.01) |
| *A21D 13/14* | (2017.01) |
| *A21D 13/22* | (2017.01) |
| *A21D 13/24* | (2017.01) |
| *A21D 13/32* | (2017.01) |
| *A21D 13/37* | (2017.01) |
| *A21D 13/40* | (2017.01) |

(52) U.S. Cl.
CPC .............. *A21D 13/31* (2017.01); *A21C 11/08* (2013.01); *A21C 11/163* (2013.01); *A21D 8/06* (2013.01); *A21D 13/14* (2017.01); *A21D 13/22* (2017.01); *A21D 13/24* (2017.01); *A21D 13/32* (2017.01); *A21D 13/37* (2017.01); *A21D 13/40* (2017.01)

(58) Field of Classification Search
None
See application file for complete search history.

(56) References Cited

U.S. PATENT DOCUMENTS

| | | | |
|---|---|---|---|
| 3,250,625 | A | 5/1966 | Thelen |
| 4,517,203 | A | 5/1985 | Levine et al. |
| 4,877,629 | A | 10/1989 | Stypula |
| 4,948,603 | A | 8/1990 | Bernacchi et al. |
| 5,194,271 | A | 3/1993 | Yanosky |
| 5,520,937 | A | 5/1996 | Yanosky et al. |
| 5,614,240 | A | 3/1997 | Young |
| 5,955,129 | A | 9/1999 | Haas, Sr. et al. |
| 6,013,300 | A | 1/2000 | Reichkitzer et al. |
| 6,265,005 | B1 | 7/2001 | Haverkos et al. |
| 6,511,691 | B1 | 1/2003 | Willoughby et al. |
| 6,623,778 | B2 | 9/2003 | Kerman et al. |
| 2002/0068115 | A1 | 6/2002 | Hayes-Jacobson |
| 2002/0094366 | A1 | 7/2002 | Kerschman et al. |
| 2004/0018287 | A1 | 1/2004 | Kerschman et al. |
| 2004/0081934 | A1 | 4/2004 | Haas et al. |
| 2004/0219271 | A1 | 11/2004 | Belknap et al. |
| 2005/0025862 | A1 | 2/2005 | Morad et al. |
| 2005/0048182 | A1 | 3/2005 | King et al. |
| 2006/0073246 | A1 | 4/2006 | Valenzky et al. |
| 2006/0121160 | A1 | 6/2006 | Peppernau et al. |
| 2008/0057157 | A1 | 3/2008 | Almeida et al. |
| 2008/0248168 | A1 | 10/2008 | Black |
| 2009/0081347 | A1 | 3/2009 | Gambino |
| 2011/0135792 | A1 | 6/2011 | Jacobson et al. |

FOREIGN PATENT DOCUMENTS

| | | |
|---|---|---|
| EP | 0683982 | 9/2008 |
| WO | 0059309 | 10/2000 |
| WO | 2011068902 | 12/2012 |
| WO | 2005112664 | 2/2013 |
| WO | 2013138581 | 8/2015 |

OTHER PUBLICATIONS

US Search Authority, Int'l Search Report and Written Opinion from corresponding PCT/US2019/065346 (Feb. 20, 2020).

*Primary Examiner* — Jyoti Chawla
(74) *Attorney, Agent, or Firm* — UB Greensfelder LLP; Brian E. Turung

(57) ABSTRACT

A multi-layered food product comprises a filling encapsulated by a partially or fully baked dough layer, and wherein the dough layer is optionally partially or fully encapsulated by a partially or fully baked batter layer that was applied to the dough layer after the dough layer had been partially or fully baked, and the multi-layered food product can optionally include one or more toppings atop the outer dough or batter layer.

54 Claims, 11 Drawing Sheets

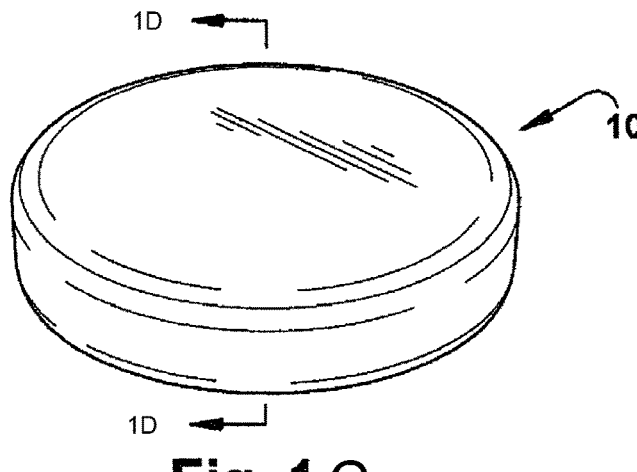
Fig. 1 C
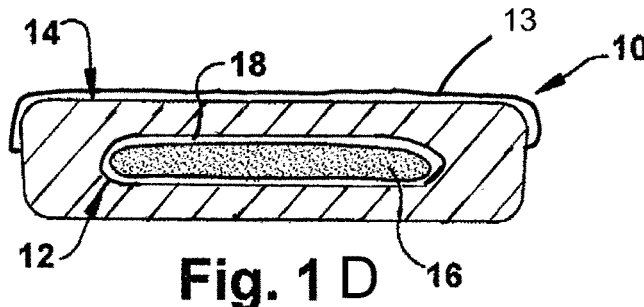
Fig. 1 D
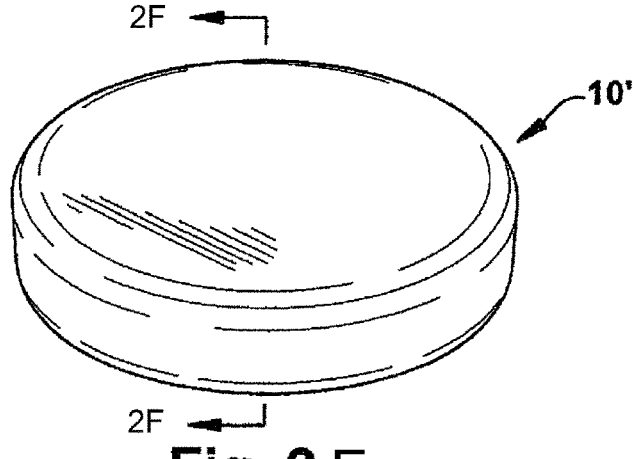
Fig. 2 E
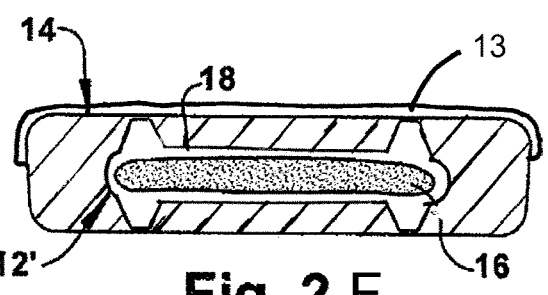
Fig. 2 F

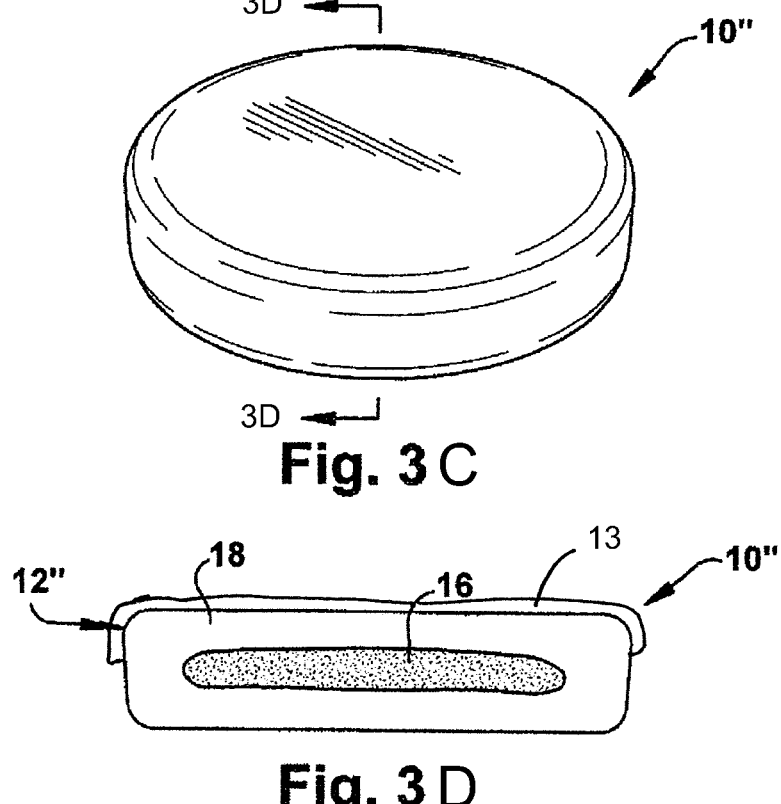
3D
10"
Fig. 3 C
12"     18     16     13     10"
Fig. 3 D

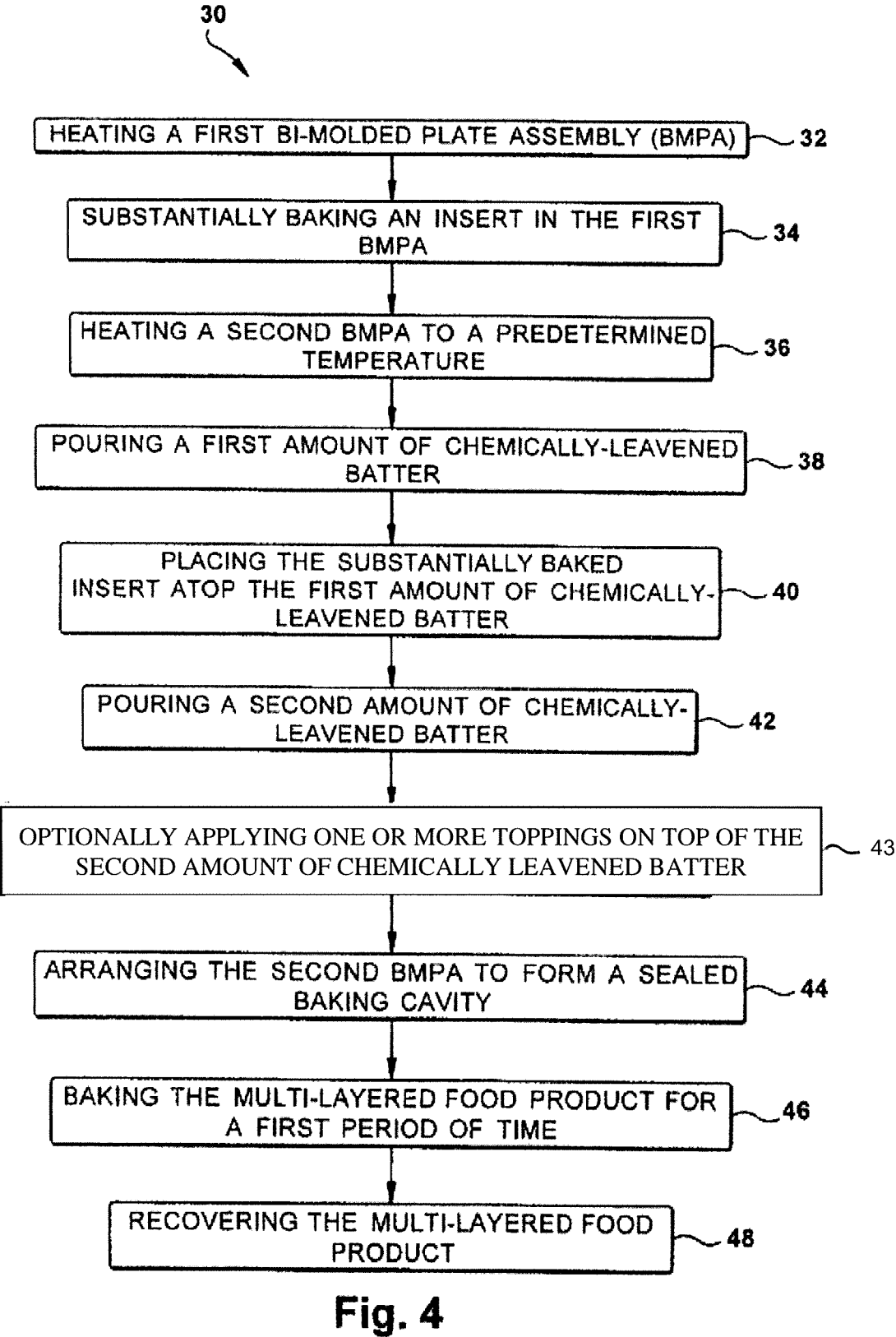

30

HEATING A FIRST BI-MOLDED PLATE ASSEMBLY (BMPA) — 32

SUBSTANTIALLY BAKING AN INSERT IN THE FIRST BMPA — 34

HEATING A SECOND BMPA TO A PREDETERMINED TEMPERATURE — 36

POURING A FIRST AMOUNT OF CHEMICALLY-LEAVENED BATTER — 38

PLACING THE SUBSTANTIALLY BAKED INSERT ATOP THE FIRST AMOUNT OF CHEMICALLY-LEAVENED BATTER — 40

POURING A SECOND AMOUNT OF CHEMICALLY-LEAVENED BATTER — 42

OPTIONALLY APPLYING ONE OR MORE TOPPINGS ON TOP OF THE SECOND AMOUNT OF CHEMICALLY LEAVENED BATTER — 43

ARRANGING THE SECOND BMPA TO FORM A SEALED BAKING CAVITY — 44

BAKING THE MULTI-LAYERED FOOD PRODUCT FOR A FIRST PERIOD OF TIME — 46

RECOVERING THE MULTI-LAYERED FOOD PRODUCT — 48

Fig. 4

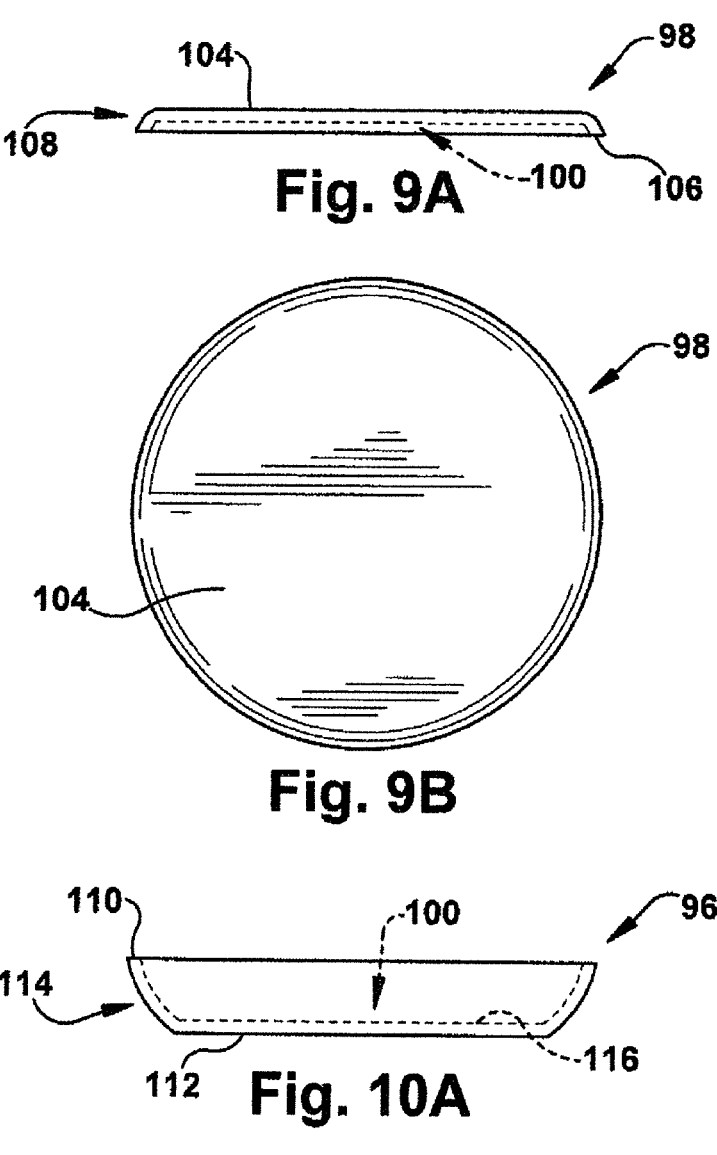
Fig. 9A
Fig. 9B
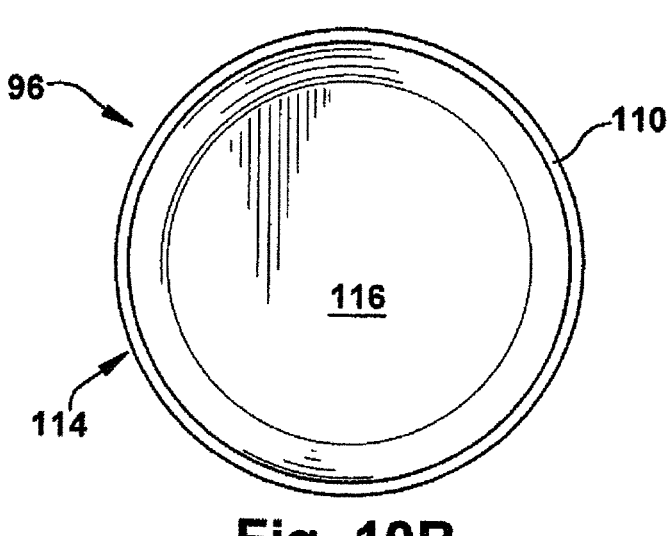
Fig. 10A
Fig. 10B

MULTI-LAYERED FOOD PRODUCT AND METHOD FOR FORMING

RELATED APPLICATIONS

This application is a continuation of U.S. patent application Ser. No. 17/533,975 filed Nov. 23, 2021, which in turn is a continuation of U.S. patent application Ser. No. 16/708,644 filed Dec. 10, 2019 (now abandoned), which in turn is a continuation-in-part of U.S. patent application Ser. No. 15/296,088 filed Oct. 18, 2016 (now U.S. Pat. No. 10,537,111), which in turn is a divisional of U.S. patent application Ser. No. 13/419,505 filed Mar. 14, 2012 (now U.S. Pat. No. 10,448,653), which is a continuation-in-Part of U.S. patent application Ser. No. 12/958,313 filed Dec. 1, 2010 (U.S. Pat. No. 10,457,804), which claims priority from U.S. Provisional Application Ser. No. 61/265,457 filed Dec. 1, 2009, wherein the entirety of each of the aforementioned applications is hereby incorporated by reference.

TECHNICAL FIELD

The disclosure relates generally to filled food products, particularly to a multi-layered food product and method for forming the multi-layered food product, more particularly to multi-layered food product that includes a filling, a dough layer about the filling, and optionally one or more toppings on the top surface of the dough layer and method for making the same; or alternatively, to a multi-layered food product that includes a filling, a dough layer about the filling, a batter layer about the dough layer, and optionally one or more toppings on the top surface of the batter layer and method for making the same.

BACKGROUND OF THE DISCLOSURE

Demand for convenience food has steadily increased in recent years. As people look to find ways to maximize free time, ready-made meals and snack products have become increasingly popular with consumers. Most households now have a microwave oven to assist in the rapid heating of food. Accordingly, a large number of ready-made meals and snacks have been developed which can be heated in a microwave oven.

While these types of snacks and meals can be quickly heated in a microwave oven, the types of meals and snacks that are suitable for heating in such ovens are, to some extent, limited. For example, snacks of a type which have a filling surrounded by a crispy coating typically cannot be satisfactorily prepared in a microwave oven. This is because steam, generated during the heating process by evaporation of water from the filling, is deleterious to organoleptic qualities of the coating. Steam penetrates the outer coating rendering it moist, soggy, and unappetizing. Such crispy-coated products are typically best prepared by heating in a conventional oven or frying in oil to maintain crispness. This considerably lengthens the time required to prepare such snacks, thus making them far less convenient to prepare.

SUMMARY OF THE DISCLOSURE

According to one non-limiting aspect of the disclosure, there is provided a multi-layered food product that includes a filling, a dough layer about the filling, and method for forming the multi-layered food product. The dough layer is formed about the filling to substantially encapsulate the filling or fully encapsulate the filling. The composition of the filling is different from the composition of the dough layer. In one non-limiting embodiment, the dough layer is a yeast-containing dough layer.

According to another non-limiting aspect of the disclosure, the one or more toppings can optionally be applied to one or more portions of the top or outer surface of the dough layer. In one non-limiting embodiment, at least 25% of the top or outer surface of the dough layer includes one or more toppings (e.g., 25-100% and all values and ranges therebetween). In one non-limiting embodiment, at least 50% of the top or outer surface of the dough layer includes one or more toppings. The one or more toppings are generally applied to the top or outer surface of the dough layer prior to the dough layer being fully baked. In one non-limiting embodiment, the one or more toppings are partially or fully applied (e.g., 1-100% of the one or more toppings applied and all values and ranges therebetween) to the top or outer surface of the dough layer prior to the dough layer being baked. In another non-limiting embodiment, the one or more toppings are partially or fully applied (e.g., 1-100% of the one or more toppings applied and all values and ranges therebetween) to the top or outer surface of the dough layer prior to the dough layer being proofed. In another non-limiting embodiment, the one or more toppings are partially or fully applied (e.g., 1-100% of the one or more toppings applied and all values and ranges therebetween) to the top or outer surface of the dough layer prior to the dough layer being fully proofed. In another non-limiting embodiment, the one or more toppings are partially or fully applied (e.g., 1-100% of the one or more toppings applied and all values and ranges therebetween) to the top or outer surface of the dough layer after the dough layer has being fully proofed and prior to the dough layer being baked. In another non-limiting embodiment, the one or more toppings are partially or fully applied (e.g., 1-100% of the one or more toppings applied and all values and ranges therebetween) to the top or outer surface of the dough layer prior to, during, and/or after the dough layer being par baked (e.g., dough layer baked 0.1-85% of fully being baked and all values and ranges therebetween) and prior to the dough layer being fully baked.

According to another non-limiting aspect of the disclosure, there is provided a multi-layered food product that includes a filling, a dough layer about the filling, and a batter layer about the yeast-containing dough layer, and method for forming the multi-layered food product. The dough layer is formed about the filling to substantially encapsulate the filling or fully encapsulate the filling. The batter layer is formed about the dough layer to substantially encapsulate the dough layer or fully encapsulate the dough layer. The composition of the filling is different from the composition of the dough layer. In one non-limiting embodiment, the dough layer is a yeast-containing dough layer. The composition of the batter layer is different from the composition of the filling and the dough layer. In one non-limiting embodiment, the batter layer is a chemically-leavened batter layer. The composition of the batter layer is different from the composition of the filling and the dough layer. During the formation of the multi-layered food product, the batter layer is coated onto the dough layer after the dough layer has been at least partially baked (e.g. baked 10-100% of full baking and all values and ranges therebetween).

According to another non-limiting aspect of the disclosure, the one or more toppings can optionally be applied to one or more portions of the top or outer surface of the batter layer. In one non-limiting embodiment, at least 25% of the top or outer surface of the batter layer includes one or more toppings (e.g., 25-100% and all values and ranges therebetween). In one non-limiting embodiment, at least 50% of the top or outer surface of the batter layer includes one or more toppings. The one or more toppings are generally applied to the top or outer surface of the batter layer prior to the batter layer being fully baked. In one non-limiting embodiment, the one or more toppings are partially or fully applied (e.g., 1-100% of the one or more toppings applied and all values and ranges therebetween) to the top or outer surface of the batter layer prior to the batter layer being baked. In another non-limiting embodiment, the one or more toppings are partially or fully applied (e.g., 1-100% of the one or more toppings applied and all values and ranges therebetween) to the top or outer surface of the batter layer prior to the batter layer being baked. In another non-limiting embodiment, the one or more toppings are partially or fully applied (e.g., 1-100% of the one or more toppings applied and all values and ranges therebetween) to the top or outer surface of the batter layer prior to the batter layer being fully baked. In another non-limiting embodiment, the one or more toppings are partially or fully applied (e.g., 1-100% of the one or more toppings applied and all values and ranges therebetween) to the top or outer surface of the batter layer after the batter layer has been fully mixed and prior to the batter layer being baked. In another non-limiting embodiment, the one or more toppings are partially or fully applied (e.g., 1-100% of the one or more toppings applied and all values and ranges therebetween) to the top or outer surface of the batter layer prior to, during, and/or after the batter layer being par baked (e.g., batter layer baked 0.1-88% of fully being baked and all values and ranges therebetween) and prior to the batter layer being fully baked.

According to another non-limiting aspect of the disclosure, the filling that can be used in the multi-layered food product is non-limiting. Non-limiting examples of fillings include meat-based fillings (e.g., hamburger-based filings, steak-based fillings, beef-based fillings, lamb-based fillings, sausage-based fillings, bacon-based fillings, ham-based fillings, turkey-based fillings, game-based fillings, fowl-based fillings, chicken-based fillings, pork-based fillings, pepperoni-based fillings, deli meat-based fillings, etc.), seafood-based fillings (e.g., fish-based fillings, shrimp-based fillings, scallop-based filings, clam-based fillings, crab-based fillings, etc.), sauces (e.g., tomato-based sauce, alfredo sauce, meat sauce, pesto sauce, etc.), stews, chili, casseroles, egg-based filling (e.g., scrambled egg filling, scrambled egg and bacon, ham, and/or sausage filling, etc.), fruit-based fillings (e.g., apple fillings, cherry fillings, berry fillings, banana fillings, etc.), dairy-based and/or non-dairy based filings (e.g., cream fillings, whipped cream fillings, cheese fillings, yogurt fillings, butter fillings, etc.), caramel fillings, jelly-based filling, jam-based filling, syrup-based filling, eggnog-based filling; butterscotch fillings, processed cereal-based fillings, oat-based fillings, grain-based fillings, rice-based fillings, hummus-based fillings, candy- or confectionary-based fillings, gelatin fillings, pudding fillings, custard fillings, chocolate fillings, fudge fillings, marshmallow fillings, nut-based fillings, vegetable-based fillings (e.g., arrowroot, artichoke, arugula, asparagus, bamboo shoots, beans, beets, broccoli, brussels sprouts, cabbage, carrot, cauliflower, celery, collards, corn, cucumber, soybeans, eggplant, ginger root, horseradish, kale, leeks, lettuce, mushrooms, mustard greens, okra, onion, peas, peppers, potato, pumpkin, radishes, rutabaga, shallots, squash, sweet potato, tomato, turnip, watercress, yam root, zucchini, etc.), gravy, nuts (e.g., peanuts, pistachios, walnuts, almonds, cashews, pecans, pine nuts, etc.), seeds (e.g., sesame seeds, pumpkin seeds, poppy seeds, sunflower seeds, flax seeds, wheat germ, etc.), butter, nut butter, confectionary, and/or a combination thereof. The filling in the multi-layered food product generally constitutes about 2-80 wt. % (and all values and ranges therebetween) of the multi-layered food product, and typically about 15-60 wt. % of the multi-layered food product.

According to another non-limiting aspect of the disclosure, the dough layer partially or fully encapsulates the filling. In one non-limiting embodiment, the dough layer encapsulates at least 70 vol. % of the filling (e.g., 70-100 vol. % and all values and ranges therebetween), typically the dough layer encapsulates at least 90 vol. % of the filling, and more typically the dough layer encapsulates at least 95 vol. % of the filling. In one non-limiting configuration, the dough layer encapsulates 100 vol. % of the filling. The dough layer is formulated to both shape the filling in the cavity of the dough layer and to give the multi-layered food product structure so that the multi-layered food product can be eaten by the hand of a user without falling apart. As such, the dough layer is formulated for elasticity and structure (e.g., gluten structure) to stretch uniformly around the filling, shape the filling, and provide a supportive structure to the multi-layered food product structure so that the multi-layered food product can be eaten by the hand of a user without falling apart.

According to another non-limiting aspect of the disclosure, the dough layer, prior to baking, includes flour (e.g., gluten flours [e.g., wheat flour, barley flour, rye flour, etc.] and/or non-gluten flours [e.g., potato flour, rice flour, corn flour, almond flour, buckwheat flour, sorghum flour, amaranth flour, teff flour, arrowroot flour, oat flour, chickpea flour, coconut flour, tapioca flour, cassava flour, tigernut flour, millet flour, navy bean flour, quinoa flour, peanut flour, etc.], water-containing component (e.g., water, milk, butterfat milk, buttermilk, and/or non-dairy milk [e.g., coconut milk, almond or other type of nut milk, soy milk, rice milk, hemp milk, etc.], etc.), and leavening agent (e.g., yeast, chemical-leavening agent, egg whites, etc.). The dough layer can optionally include flavorings and/or spices (e.g., butter flavor, almond extract, vanilla extract, cinnamon, nutmeg, etc.), salt, milk powder, gluten (a gluten source other than gluten flour [e.g., vital wheat gluten, etc.]), sweetener (e.g., sugar, sucrose, fructose, corn syrup, HFCS, artificial sweetener, etc.), shortening (e.g., butter, margarine, vegetable oil, peanut oil, lard, corn oil, coconut oil, sunflower oil, soybean oil, olive oil, palm oil, canola oil, etc.), and/or eggs. In one non-limiting embodiment, the dough layer, prior to being baked, includes 25-70 wt. % flour (and all values and ranges therebetween), 20-60 wt. % water-containing component (and all values and ranges therebetween), and 0.2-7 wt. % leavening agent (and all values and ranges therebetween). In another non-limiting embodiment, the dough layer, prior to being baked, includes 25-69 wt. % flour (and all values and ranges therebetween), 20-58 wt. % water containing component (and all values and ranges therebetween), 0.2-6 wt. % leavening agent (and all values and ranges therebetween), 0-10 wt. % milk powder (and all values and ranges therebetween), 0-16 wt. % eggs (and all values and ranges therebetween), 0-9 wt. % gluten (and all values and ranges therebetween), 2-20 wt. % sweetener (and all values and ranges therebetween), 0-18 wt. % shortening (and all values and ranges therebetween), 0-3 wt. % salt (and all values and ranges therebetween), and 0-5 wt. % flavoring agent (and all values and ranges therebetween). In another non-limiting embodiment, the dough layer, prior to being baked, includes 27-68 wt. % flour, 21-57 wt. % water, 0-9 wt. % milk powder, 2-15 wt. % eggs, 2-5 wt. % gluten, 2-15 wt. % sugar, 0-15 wt. % oil, 0.5-15 wt. % yeast, 0.5-2 wt. % salt, and 0-3 wt. % flavoring agent. In another non-limiting embodiment, the dough layer, prior to being baked, includes 45-60 wt. % flour, 21-30 wt. % water, 0-7 wt. % milk powder, 5-12 wt. % eggs, 0-4 wt. % gluten, 2-12 wt. % sugar, 0-12 wt. % oil, 0.5-8 wt. % yeast, 0.5-2 wt. % salt, 0-2 wt. % flavoring agent. In another non-limiting embodiment, the dough layer, prior to being baked, includes 30-69 wt. % flour, 20-40 wt. % water-containing component (and all values and ranges therebetween), 0.2-6 wt. % leavening agent (and all values and ranges therebetween) wherein 60-100% of the leavening agent is chemically-leavening agent, 0-9 wt. % milk powder (and all values and ranges therebetween), 0-14 wt. % eggs (and all values and ranges therebetween), 0-8 wt. % gluten (and all values and ranges therebetween), 2-218 wt. % sweetener (and all values and ranges therebetween), 0-16 wt. % shortening (and all values and ranges therebetween), 0-3 wt. % salt (and all values and ranges therebetween), and 0-4 wt. % flavoring agent (and all values and ranges therebetween). In another non-limiting embodiment, the dough layer includes yeast. The yeast can constitute 20-100% (and all values and ranges therebetween) of the leavening agent in the dough layer, and typically constitutes 80-100% of the leavening agent in the dough layer. In another non-limiting embodiment, the dough layer is absent yeast. In another non-limiting embodiment, the dough layer includes eggs. The eggs facilitate in creating structure and stability within the dough layer, facilitate in thickening the dough layer, add moisture to the dough layer, and/or facilitate in the rising of the dough layer during the proofing and baking of the dough layer. In another non-limiting embodiment, the dough layer includes gluten. The gluten is used to facilitate in providing structure to the dough layer. The gluten can be added as a separate component and/or a gluten-containing flour can be used to supply the gluten to the dough layer. Generally, the gluten content of the dough layer is 1-18 wt. % gluten (and all values and ranges therebetween), and typically 5-12 wt. % gluten. The prebaked dough used to form the dough layer generally has a viscosity of about 100,000-1,500,000 cps at 21° C. As such, the dough cannot be poured about the filling at 21° C., thus must be formed about the filling. The forming of the dough layer about the filling can be by hand and/or by use of a machine. In one non-limiting method, a portion of the prebaked dough is selected and a cavity is depressed or otherwise formed in the dough portion. Thereafter, a filling is placed in the cavity and the outer edges of the dough pushed together to partially or fully close the cavity so as to partially or fully encapsulate the filling in the cavity of the dough, and/or another piece of dough can be placed over the filling in the cavity to partially or fully encapsulate the filling in the cavity of the dough. The dough layer in the multi-layered food product generally constitutes about 8-70 wt. % (and all values and ranges therebetween) of the multi-layered food product, and typically about 10-60 wt. % of the multi-layered food product.

According to another non-limiting aspect of the disclosure, the batter layer, prior to baking, includes flour (e.g., gluten flours [e.g., wheat flour, barley flour, rye flour, etc.] and/or non-gluten flours [e.g., rice flour, corn flour, almond flour, buckwheat flour, sorghum flour, amaranth flour, teff flour, arrowroot flour, oat flour, chickpea flour, coconut flour, tapioca flour, cassava flour, tigernut flour, millet flour, navy bean flour, quinoa flour, peanut flour, etc.], water-containing component (e.g., water, milk, butterfat milk, buttermilk, and/or non-dairy milk [e.g., coconut milk, almond or other type of nut milk, soy milk, rice milk, hemp milk, etc.], etc.), and leavening agent (e.g., chemical-leavening agent, egg whites, etc.). The batter layer can optionally include flavorings and/or spices (e.g., butter flavor, almond extract, vanilla extract, cinnamon, nutmeg, etc.), salt, milk powder, sweetener (e.g., sugar, honey, sucrose, fructose, corn syrup, HFCS, artificial sweetener, etc.), shortening (e.g., butter, margarine, vegetable oil, peanut oil, lard, corn oil, coconut oil, sunflower oil, palm oil, soybean oil, olive oil, canola oil, etc.), and/or eggs. In one non-limiting embodiment, the batter layer, prior to being baked, includes 12-48 wt. % flour (and all values and ranges therebetween), 10-75 wt. % water-containing component (and all values and ranges therebetween), and 0.2-7 wt. % leavening agent (and all values and ranges therebetween). In another non-limiting embodiment, the batter layer, prior to being baked, includes 15-45 wt. % flour (and all values and ranges therebetween), 12-68 wt. % water-containing component (and all values and ranges therebetween), 0.2-7 wt. % leavening agent (and all values and ranges therebetween), 0-12 wt. % milk powder (and all values and ranges therebetween), 0-40 wt. % eggs (and all values and ranges therebetween), 0-30 wt. % sweetener (and all values and ranges therebetween), 0-18 wt. % shortening (and all values and ranges therebetween), 0-3 wt. % salt (and all values and ranges therebetween), and 0-5 wt. % flavoring agent (and all values and ranges therebetween). In another non-limiting embodiment, the batter layer, prior to being baked, includes 15-40 wt. % flour, 29-68 wt. % water-containing component, 0.5-5 wt. % baking powder, 0-2 wt. % baking soda, 0-12 wt. % milk powder, 5-40 wt. % eggs, 0-17 wt. % sugar, 0-15 wt. % oil, 0.5-3 wt. % salt, and 0-3 wt. % flavoring agent. In another non-limiting embodiment, the batter layer includes chemical-leavening agent. The chemical-leavening agent can constitute 50-100% (and all values and ranges therebetween) of the leavening agent in the batter layer, and typically constitutes 100% of the leavening agent in the batter layer. In another non-limiting embodiment, the batter layer includes eggs. The eggs facilitate in adding moisture to the batter layer and/or facilitate in the rising of the batter layer. The batter layer has a different formulation from the dough layer. The prebaked batter (known as the slurry) used to form the batter layer generally has a viscosity of about 1000-10,000 cps at 21° C. Generally, the viscosity of the batter prior to baking is at least 5 times less than the viscosity of the dough prior to baking, and typically the viscosity of the batter prior to baking is at least 20 times less than the viscosity of the dough prior to baking. As such, the batter has a consistency such that it can be poured about the dough layer during the formation of the multi-layered food product. The batter layer in the multi-layered food product generally constitutes about 8-70 wt. % (and all values and ranges therebetween) of the multi-layered food product, and typically about 15-60 wt. % of the multi-layered food product. The batter is formulated to create a delicate, light, and airy cake/quick bread-type layer when baked. The primary purpose of the batter layer is not to create structure for the multi-layered food product. Such is the purposes of the dough layer. The batter layer creates a very light and delicate breading, and a desirable texture and mouth-feel for the multi-layered food product.

According to another non-limiting aspect of the disclosure, the thickness of the batter layer and the dough layer after the multi-layered food product has been fully baked are typically different. Generally, the thickness of the dough layer is less than the thickness of the batter layer. In one non-limiting embodiment, the thickness of the batter layer after the multi-layered food product has been fully baked is at least twice the thickness of the dough layer, and typically the thickness of the batter (or cake) layer after the multi-layered food product has been fully baked is at least five times the thickness of the dough (typically yeast bread) layer. The thicker batter layer is important to the multi-layered food product to create the desired texture, mouth feel, and organoleptic properties of the multi-layered food product. The thinner dough layer is used to provide a strong, thin, structural inner layer that shapes the filling and provides the multi-layered food product structure so that it can be eaten by hand after fully being baked. The thicker batter layer forms a light and airy soft layer about the dough layer to create the desired feel, texture, and mouth feel of the multi-layered food product when held and eaten by the user. A dough layer having the same or greater thickness than the batter layer would result in a chewier product that would have a very different feel, texture, and mouth feel from the multi-layered food product in accordance with the present disclosure. In one non-limiting embodiment, the thickness of the dough layer after the multi-layered food product has been fully baked is 0.05-0.3 inches (and all values and ranges therebetween), and the thickness of the batter layer after the multi-layered food product has been fully baked is 0.25-1 inches (and all values and ranges therebetween). In another non-limiting embodiment, the ratio of the thickness of the batter layer to the dough layer after the multi-layered food product has been fully baked is about 1.1:1 to 20:1 (and all values and ranges therebetween), and typically 2:1 to 15:1, and more typically 2.1:1 to 10:1.

According to another non-limiting aspect of the disclosure, the density of the dough layer is generally greater than the batter layer after the multi-layered food product has been fully baked. In one non-limiting embodiment, the density ratio of the dough layer to the batter layer after the multi-layered food product has been fully baked is 1.1:1 to 10:1 (and all values and ranges therebetween), and typically 1.1:1 to 5:1.

According to another non-limiting aspect of the disclosure, the thickness of the dough layer and the topping(s) layer after the multi-layered food product has been fully baked are typically different. In one non-limiting embodiment, the total thickness of the one or more toppings is 0.01-0.5 in. (and all values and ranges therebetween). In another non-limiting embodiment, the total thickness of the one or more toppings is 0.025-0.4 in. Generally, the total thickness of the one or more toppings constitutes 2-500% of the thickness of the dough layer (and all values and ranges therebetween) after multi-layered food product has been fully baked. In one non-limiting configuration, the total thickness of the one or more toppings constitutes 5-200% of the thickness of the dough layer after multi-layered food product has been fully baked. When the multi-layered food product includes a batter layer and one or more toppings, the total thickness of the one or more toppings constitutes 1-70% of the thickness of the batter layer (and all values and ranges therebetween) after the multi-layered food product has been fully baked. In one non-limiting configuration, when the multi-layered food product includes a batter layer and one or more toppings, the total thickness of the one or more toppings constitutes 2-50% of the thickness of the batter layer after the multi-layered food product has been fully baked. In another non-limiting configuration, when the multi-layered food product includes a batter layer and one or more toppings, the total thickness of the one or more toppings constitutes 10-50% of the thickness of the batter layer after the multi-layered food product has been fully baked. In one embodiment, the thickness of the one or more toppings is less than the thickness of the batter layer after the multi-layered food product has been fully baked. Generally, the thickness ratio of the batter layer to the total thickness of the toppings after the multi-layered food product has been fully baked is 1.1:1 to 10000:1 (and all values and ranges therebetween), and typically 2:1 to 1000:1.

According to another non-limiting aspect of the disclosure, the one or more toppings that can be applied to the top surface of the dough layer or the batter layer can include one or more dairy ingredients (e.g., shredded cheese [e.g., cheddar, swiss, mozzarella, habanero, parmesan, etc.], cheese powders [e.g., cheddar, butter, nacho, sour cream & onion, parmesan, blue cheese etc.]), artificial dairy ingredients (e.g., artificial cheese and/or cheese powders, etc.), vegetables (e.g., broccoli, asparagus, chives, onions, corn, peppers, spinach, broccoli, etc.), tomatoes, sun-dried tomatoes, mushrooms, olives, herbs (e.g., rosemary, thyme, basil, red pepper, parsley, etc.), toasted crumbs (e.g., corn bread, croutons, panko, etc.), seasonings (e.g., barbecue, tomato sauce, pasta sauce, nacho, jalapeno, hot peppers, garlic, chili powder, cumin, cayenne pepper, red pepper, salt, pepper, pizza flavor, cinnamon, nutmeg, etc.), sugars (e.g., cane, beet, cinnamon sugar, sugar sprinkles, various confectionary products, syrup, etc.), caramel, chocolate and/or chocolate powder, butterscotch, butter, nut butter, nuts (e.g., peanuts, pistachios, walnuts, almonds, cashews, pecans, pine nuts, etc.), seeds (e.g., sesame seeds, pumpkin seeds, poppy seeds, sunflower seeds, flax seeds, wheat germ, etc.), and/or clusters (e.g., oat, granola, wheat, cheese, savory and sweet clusters, nut, sweet streusel, etc.). The one or more toppings that can be applied to the top surface of the dough layer or the batter layer are formulated to fully bond with the dough layer or batter layer when the multi-layered food product is fully baked. The one or more toppings are used to 1) provide improved taste, 2) provide more impactful flavor, 3) create an improved appearance, 4) create an artisan appearance, 5) create a crafted appearance, and/or 6) create a homemade appearance to the multi-layered food product when the multi-layered food product is fully baked.

According to another non-limiting aspect of the disclosure, the one or more toppings that can be applied to the top surface of the dough layer or the batter layer generally constitutes about 0.5-20 wt. % (and all values and ranges therebetween) of the fully baked multi-layered food product. In one non-limiting embodiment, the one or more toppings in the multi-layered food product generally constitute about 1-15 wt. % of the fully baked multi-layered food product. In another non-limiting embodiment, the one or more toppings in the multi-layered food product generally constitute about 3-7 wt. % of the fully baked multi-layered food product.

According to another non-limiting aspect of the disclosure, the one or more toppings that can be applied to the top surface of the dough layer or the batter layer are formulated to partially (at least 20% caramelization of the topping) or fully caramelize when the multi-layered food product is fully baked, which further improves the taste, flavor, and appearance of the multi-layered food product, and which partial or full caramelization enhances the bonding of the partially or fully caramelized topping to the dough layer or to the batter layer.

According to another non-limiting aspect of the disclosure, about 5-100% (and all values and ranges therebetween) of the one or more toppings that are applied to the top surface of the batter layer are partially or fully embedded in the batter layer prior to the full baking of the batter layer. In one non-limiting configuration, about 55-100% of the one or more toppings (and all values and ranges therebetween) that are applied to the top surface of the batter layer are partially or fully embedded in batter layer prior to the full baking of the batter layer. Such partial or full embedding of the one or more toppings in the batter layer facilitates in the enhanced bonding to the one or more toppings to the batter layer after the multi-layered food product has been fully baked. Such enhanced bonding inhibits or prevents the one or more toppings from falling off or releasing from the batter layer when 1) the multi-layered food product is placed in a toaster or oven (thereby reducing mess, cleanup, and/or burning odor in the toaster or oven) and/or 2) the multi-layered food product is to be eaten by hand by a consumer (thereby reducing mess and cleanup).

According to another non-limiting aspect of the disclosure, there is provided a closed-cavity baking container or vessel that is used to partially or fully bake the multi-layered food product. The shape of the closed-cavity baking container is non-limiting (e.g., puck-shaped, cylindrical-shaped, waffle-shaped, disc- or saucer-shaped, etc.). The closed-cavity baking container or vessel can result in a portion of the inner surface of the cavity pressing the one or more toppings partially or fully into the dough layer or batter layer, thereby facilitating in the securing of the one or toppings to the dough layer or batter layer; however, this is not required. The closed-cavity baking container can also create an elevated pressure from the production of gasses and/or steam during the baking of the multi-layered food product, which elevated pressure facilitates in causing the partial or full bonding of the one or more toppings to the dough layer or batter layer. The pressure and steam that is created in the closed-cavity baking container or vessel further ensures that the one or more toppings are completely and seamlessly bonded to the dough layer or batter layer. Such pressure in the closed-cavity baking container or vessel during the baking of the multi-layered food product is at least 0.1 Atm. above ambient pressure or sea level pressure, and typically 0.1-5 Atm. (and all values and ranges therebetween) above ambient pressure or sea level pressure.

The baking time in the closed-cavity baking container or vessel is generally at least 0.5 minutes, and typically 1-120 minutes (and all values and ranges therebetween) at a temperature of 180-550° F. Generally, the baking of the multi-layered food product in the closed-cavity baking container or vessel is by non-microwave cooking (e.g., convection heating, conduction heating).

According to another non-limiting aspect of the disclosure, after the one or more toppings are added to the top surface of the dough layer or batter layer, a butter or oil spray optionally can be applied to the one or more toppings to 1) inhibit or present prevent sticking of the one or more toppings to a baking surface, and/or 2) further improve the appearance of the one or more toppings on the multi-layered food product through increased caramelization of the one or more toppings after the multi-layered food product has been fully baked.

According to another non-limiting aspect of the disclosure, there is provided a method for forming a multi-layered food product. The method includes a) providing a filling, b) providing a dough layer, c) partially or fully encapsulating the filling in the dough layer, and d) partially or fully baking the dough layer. The method can optionally include the step of adding one or more toppings to the outer surface of the dough layer. The dough layer is partially or fully baked to allow the dough layer to set and render it be safe for consumption. The method can optionally include providing one or more toppings on top of the dough layer. Generally, the dough layer encapsulates about 70-100% of the filling. The dough layer is baked for a time period such that the dough layer is 50-100% fully baked (and all values and ranges therebetween), and typically the dough layer is baked for a time period such that the dough layer is 75-100% fully baked. The method can optionally further include the step of partially or fully proofing the dough layer prior to the partial or full baking of the dough layer. Generally, the dough layer, when proofed, is allowed to proof for a time period to enable the dough to be 50-100% proofed (and all values and ranges therebetween), and typically is allowed to proof for a time period to enable the dough to be 80-100% proofed. The method can optionally further include the step of shaping the dough layer after the dough layer has partially or fully encapsulated the filling and prior to the partial or full baking of the dough layer. In one non-limiting embodiment, the dough layer that includes the filling is shaped into a generally puck-shape; however, it can be appreciated that the dough layer can be shaped into other shapes (e.g., rectangular, circular, ovoid, square, triangular, cylindrical, star-shaped, or any other polygonal shape). During the shaping of the dough layer, the top of the dough layer is generally pressed downwardly such that the top and bottom portions of the dough layer that includes the fillings are flattened. Generally, the average height to maximum width ratio of the shaped dough layer is generally 1:2, typically 1:3, and more typically 1:4. The shaping of the dough layer can be by hand and/or by a machine. The method can optionally include the step of partially or fully baking the dough layer in a bi-molded plate assembly that has a central cavity that can form a closed enclosure during the baking of the multi-layered food product. One or both of the plates of the bi-molded plate assembly include a cavity that is designed to partially or fully receive the multi-layered food product when the two plates are positioned together to form a closed central cavity. The shape of the cavity is non-limiting (e.g., puck-shaped, cylindrical-shaped, waffle-shaped, disc- or saucer-shaped, star-shaped, cube-shaped, box-shaped, etc.).

During the partial or full baking of the dough layer of the multi-layered food product, the closed central cavity at least partially entraps steam and/or other gasses generated during the baking of the dough layer and the heating of the filling, thereby causing a pressure increase in the central cavity during the partial or full baking of the dough layer of the multi-layered food product. Such pressure increase in the central cavity can 1) facilitate in the baking of the dough layer, and/or 2) facilitate in the bonding of the one or more toppings optionally on the surface of the dough layer. Also, the closed central cavity can result in a portion of the inner surface of the closed central cavity pressing the one or more toppings partially or fully into the dough layer or batter layer, thereby facilitating in the securing of the one or toppings to the dough layer or batter layer; however, this is not required.

The method can optionally further include the step of packaging, freezing, and storing the multi-layered food product after the dough layer has been partially or fully baked. When the multi-layered food product is frozen for storage, the frozen multi-layered food product can simply be a) allowed to warm in an ambient temperature environment (e.g., placed on a countertop in a kitchen wherein the ambient temperature is 60-100° F. etc.) and then eaten when sufficiently warmed in the ambient temperature environment, b) heated in a microwave oven to heat the multi-layered food product to a desired eating temperature, c) heated in a combination of a microwave oven and oven or toaster oven wherein the microwave oven is used to heat the filling and the oven or toaster oven is used to toast the multi-layered food product exterior, and/or d) heated in an oven or toaster oven or on a heating plate or stove top to heat the multi-layered food product to a desired eating temperature. The multi-layered food product can be optionally covered in ovenable crisping overwrap packaging film (e.g., vented overwrap packaging film) prior to being heated within an oven or toaster oven to increase crisping and/or to prevent over-baking and drying out the multi-layered food product. If the dough layer has only been partially baked prior to the freezing of the multi-layered food product, the multi-layered food product can be heated for a sufficient time period to obtain the desired amount of baking of the dough layer prior to consumption of the multi-layered food product.

According to another non-limiting aspect of the disclosure, there is provided a method for forming a multi-layered food product. The method includes a) providing a filling, b) providing a dough layer, c) partially or fully encapsulating the filling in the dough layer, d) partially or fully baking the dough layer, e) providing a batter layer, f) partially or fully encapsulating the dough layer that includes the filling after the dough layer has been partially or fully baked, and g) partially or fully baking the batter layer. The method can optionally include the step of adding one or more toppings to the outer surface of the batter layer. Generally, the dough layer encapsulates about 70-100% of the filling. The dough layer is baked for a time period such that the dough layer is 50-100% fully baked (and all values and ranges therebetween), and typically the dough layer is baked for a time period such that the dough layer is 75-100% fully baked. The method can optionally include the step of partially or fully baking the dough layer in a bi-molded plate assembly that has a central cavity that can form a closed enclosure during the baking of the multi-layered food product. One or both of the plates of the bi-molded plate assembly include a cavity that is designed to partially or fully receive the multi-layered food product when the two plates are positioned together to form a closed central cavity. The closed baking cavity can mean the cavity is between 90% and 100% closed and all values in between. Typically, the baking cavity is between 98% and 100% closed or fully mated. The shape of the cavity is non-limiting (e.g., puck shaped, cylindrical shaped, waffle-shaped, disc or saucer-shaped body, star-shaped, cube-shaped, box-shaped, etc.).

During the partial or full baking of the dough layer of the multi-layered food product, the closed central cavity at least partially entraps steam and/or other gasses generated during the baking of the dough layer and the heating of the filling, thereby causing a pressure increase in the central cavity during the partial or full baking of the dough layer of the multi-layered food product. Such pressure increase in the central cavity can facilitate in the baking of the dough layer. Generally, the batter layer encapsulates about 70-100% of the outer surface of the dough layer. Generally, the batter layer is baked for a time period such that the batter layer is 50-100% fully baked (and all values and ranges therebetween), and typically the batter layer is baked for a time period such that the batter layer is 75-100% fully baked. The method can optionally further include the step of partially or fully proofing the dough layer prior to the partial or full baking of the dough layer. Generally, the dough layer, when proofed, is allowed to proof for a time period to enable the dough to be 50-100% proofed (and all values and ranges therebetween), and typically is allowed to proof for a time period to enable the dough to be 80-100% proofed. The method can optionally further include the step of shaping the dough layer after the dough layer has partially or fully encapsulated the filling and prior to the partial or full baking of the dough layer. In one non-limiting embodiment, the dough layer that includes the filling is shaped into a generally puck-shape; however, it can be appreciated that the dough layer can be shaped into other shapes (e.g., rectangular, circular, ovoid, square, triangular, cylindrical, star, or any other polygonal shape). During the shaping of the dough layer, the top of the dough layer is generally pressed downwardly such that the top and bottom portions of the dough layer that includes the fillings are flattened. Generally, the average height to maximum width ratio of the shaped dough layer is generally 1:2, typically 1:3, and more typically 1:4. The shaping of the dough layer can be by hand and/or by a machine. The method can optionally further include the step of pouring batter over the dough layer that includes the filling after the dough layer has been partially or fully baked so as to partially or fully encapsulate the dough layer with the batter so that a batter layer can be formed partially or fully about the dough layer. In one non-limiting arrangement, a first cooking surface is provided wherein batter (first batter pouring) is poured onto the surface of the cooking surface. Thereafter, the partially or fully baked dough layer that includes the filling is placed onto the batter on the cooking surface. Thereafter, additional batter (second batter pouring) is poured over the dough layer so as to partially or fully encapsulate the dough layer with the batter. Thereafter, a second cooking surface is positioned over the batter-covered top surface of the dough layer and the two cooking surfaces form a closed cavity about the multi-layered food product and to partially or fully bake the batter so as to form a batter layer partially or fully about the dough layer. The shape of the closed cavity is non-limiting (e.g., puck-shaped, cylindrical-shaped, waffle-shaped, disc- or saucer-shaped, star-shaped, cube-shaped, box-shaped, etc.). For example, a first and second bi-molded plate assembly can be used for the first and second cooking surfaces. During the batter cooking process, the cooking plates can be optionally rotated about a central axis of the multi-layered food product to facilitate in the even distribution of the batter about the dough layer during the partial or full baking of the batter. The method can optionally include the step of applying one or more toppings to the batter layer. In one arrangement, the one or more toppings are applied to the batter layer after the additional batter (second batter pouring) is poured over the dough layer. When a first and second cooking surface are used to partially or fully bake the batter layer, the one or more toppings are applied to the top surface of the batter layer prior to the first and second cooking surface being placed together to form a closed cavity about the multi-layered food product. The method can optionally further include the step of packaging, freezing, and storing the multi-layered food product after the batter has been partially or fully baked. When the multi-layered food product is frozen for storage, the frozen multi-layered food product can simply be a) allowed to warm in an ambient temperature environment (e.g., placed on a countertop in a kitchen wherein the ambient temperature is 60-100° F. etc.) and then eaten when sufficiently warmed in the ambient temperature environment, b) heated in a microwave oven to heat the multi-layered food product to a desired eating temperature, c) heated in a combination of a microwave oven and oven or toaster oven wherein the microwave oven is used to heat the filling and the oven or toaster oven is used to toast the multi-layered food product exterior, d) heated in an oven or toaster oven or on a heating plate or stove top to heat the multi-layered food product to a desired eating temperature. The multi-layered food product can be optionally covered in ovenable crisping overwrap packaging film (e.g., vented overwrap packaging film) prior to being heated within an oven or toaster oven to increase crisping and/or to prevent over-baking and drying out the multi-layered food product. If the dough layer and/or batter layer has only been partially baked prior to the freezing of the multi-layered food product, the multi-layered food product can be heated for a sufficient time period to obtain the desired amount of baking of the dough layer and/or batter layer prior to consumption of the multi-layered food product.

According to another non-limiting aspect of the disclosure, the one or more toppings can be applied to the dough layer or batter layer via any commercially viable approach such as, but not limited, to 1) sprinkling the one or more toppings by hand onto the dough layer or batter layer, b) a topping hand-shaker with various diameter openings on the lids or top of the shakers to control the amount of the one or more toppings being applied to the dough layer or batter layer, and/or c) using any commercially available topping applicator machine(s) to apply the one or more toppings to the dough layer or batter layer. When a topping applicator machine is used, such machine can vary its aperture in order to target the center of the multi-layered food product and to provide even topping coverage over the top of the dough layer or batter layer.

One non-limiting object of the present disclosure is the provision of a multi-layered food product that includes a filling, a dough layer about the filling, and optionally one or more toppings on the dough layer.

Another non-limiting object of the present disclosure is the provision of multi-layered food product that includes a filling, a dough layer about the filling, and optionally one or more toppings on the dough layer, and wherein the dough layer is a yeast-containing dough layer.

Another non-limiting object of the present disclosure is the provision of a multi-layered food product that includes a filling, a dough layer about the filling, and optionally one or more toppings on the dough layer, and wherein the dough layer is a non-yeast-containing dough layer.

Another non-limiting object of the present disclosure is the provision of a multi-layered food product that includes a filling, a dough layer about the filling, a batter layer about the dough layer, and optionally one or more toppings on the batter layer.

Another and/or alternative non-limiting object of the present disclosure is the provision of a multi-layered food product that includes a filling, a yeast-containing dough layer about the filling, a chemically-leavened batter layer about the dough layer, and optionally one or more toppings on the batter layer.

Another and/or alternative non-limiting object of the present disclosure is the provision of a multi-layered food product that combines the strength and functionality of yeast-leavened dough or breading with the delicate eating quality of a quick bread or cake.

Another and/or alternative non-limiting object of the present disclosure is the provision of a multi-layered food product that includes a yeast-leavened dough which provides structural integrity to the multi-layered food product to facilitate eating by hand, and a chemically-leavened batter layer that gives the multi-layered food product a soft and appealing, cake-like eating quality, which is absent in purely yeast-leavened bread products.

Another and/or alternative non-limiting object of the present disclosure is the provision of a multi-layered food product that includes a yeast-leavened dough or non-yeast leavened dough which provides structural integrity and helps to shape the filling within the multi-layered food product to facilitate eating by hand, and a chemically-leavened batter layer that gives the multi-layered food product a soft and appealing, cake-like eating quality, which is absent in purely yeast-leavened bread products.

Another and/or alternative non-limiting object of the present disclosure is the provision of a multi-layered food product that can be initially warmed in a microwave oven and then reconstituted in an oven or toaster to yield a multi-layered food product having a crispy exterior and a soft interior without the chewy or tough consistency of a typical yeast-leavened bread product.

Another and/or alternative non-limiting object of the present disclosure is the provision of a multi-layered food product that has a dough layer formed about the filling to substantially or fully encapsulate the filling.

Another and/or alternative non-limiting object of the present disclosure is the provision of a multi-layered food product that has a batter layer formed about the dough layer to substantially or fully encapsulate the dough layer.

Another and/or alternative non-limiting object of the present disclosure is the provision of a multi-layered food product wherein the batter layer is coated onto the dough layer after the dough layer has been partially or fully baked.

Another and/or alternative non-limiting object of the present disclosure is the provision of a multi-layered food product wherein the batter layer is coated onto the dough layer after the dough layer has been partially or fully proofed and partially or fully baked.

Another and/or alternative non-limiting object of the present disclosure is the provision of a multi-layered food product wherein the filling in the multi-layered food product generally constitutes about 2-80 wt. % of the multi-layered food product.

Another and/or alternative non-limiting object of the present disclosure is the provision of a multi-layered food product wherein the dough layer is formulated to both shape the filling in the cavity of the dough layer and give the multi-layered food product structure so that the multi-layered food product can be eaten by the hand of a user without falling apart.

Another and/or alternative non-limiting object of the present disclosure is the provision of a multi-layered food product wherein the dough layer is formulated for elasticity and structure to stretch uniformly around the filling, shape the filling, provide a supportive structure to the multi-layered food product structure so that the multi-layered food product can be eaten by the hand of a user without falling apart, and while holding its shape.

Another and/or alternative non-limiting object of the present disclosure is the provision of a multi-layered food product wherein the dough layer, prior to baking, includes flour, water containing component, leavening agent, and optionally, flavorings and/or spices, salt, milk powder, gluten, sweetener, shortening, and/or eggs.

Another and/or alternative non-limiting object of the present disclosure is the provision of a multi-layered food product wherein the dough layer, prior to baking, includes 25-70 wt. % flour, 20-60 wt. % water-containing component, 0.2-7 wt. % leavening agent, 0-10 wt. % milk powder, 0-16 wt. % eggs, 0-9 wt. % gluten, 0-20 wt. % sweetener, 0-18 wt. % shortening, 0-3 wt. % salt, and 0-5 wt. % flavoring agent.

Another and/or alternative non-limiting object of the present disclosure is the provision of a multi-layered food product wherein the dough layer, prior to baking, includes yeast, wherein the yeast constitutes 20-100% of the leavening agent in the dough layer.

Another and/or alternative non-limiting object of the present disclosure is the provision of a multi-layered food product wherein the dough layer, prior to baking, includes eggs to facilitate in creating structure and stability within the dough layer, thickening the dough layer, adding moisture to the dough layer, and/or improving the rising of the dough layer during the proofing and baking of the dough layer.

Another and/or alternative non-limiting object of the present disclosure is the provision of a multi-layered food product wherein the dough layer, prior to baking, includes gluten to facilitate in providing structure to the dough layer.

Another and/or alternative non-limiting object of the present disclosure is the provision of a multi-layered food product wherein the dough layer, prior to baking, has a viscosity of about 100,000-1,500,000 cps at 21° C. such that the dough cannot be poured about the filling at 21° C.

Another and/or alternative non-limiting object of the present disclosure is the provision of a multi-layered food product wherein the dough layer, prior to baking, constitutes about 8-70 wt. % of the multi-layered food product.

Another and/or alternative non-limiting object of the present disclosure is the provision of a multi-layered food product wherein the batter layer, prior to baking, includes flour, water-containing component, leavening agent, and optionally flavorings and/or spices, salt, milk powder, sweetener, shortening, and/or eggs.

Another and/or alternative non-limiting object of the present disclosure is the provision of a multi-layered food product wherein the batter layer, prior to baking, includes 12-48 wt. % flour, 10-75 wt. % water-containing component, 0.2-7 wt. % leavening agent, 0-12 wt. % milk powder, 0-40 wt. % eggs, 0-30 wt. % sweetener, 0-18 wt. % shortening, 0-3 wt. % salt, and 0-5 wt. % flavoring agent.

Another and/or alternative non-limiting object of the present disclosure is the provision of a multi-layered food product wherein the batter layer, prior to baking, includes a chemical-leavening agent that constitutes 50-100% of the leavening agent in the batter layer.

Another and/or alternative non-limiting object of the present disclosure is the provision of a multi-layered food product wherein the batter layer, prior to baking, includes eggs to facilitate in adding moisture and/or flavor to the batter layer and/or facilitate in the rising and/or structure of the batter layer.

Another and/or alternative non-limiting object of the present disclosure is the provision of a multi-layered food product wherein the batter layer, prior to baking, has a different formulation from the dough layer.

Another and/or alternative non-limiting object of the present disclosure is the provision of a multi-layered food product wherein the batter layer, prior to baking, has a viscosity of about 1000-10,000 cps at 21° C.

Another and/or alternative non-limiting object of the present disclosure is the provision of a multi-layered food product wherein the batter layer, prior to baking, has a viscosity that is at least 10 times less than the viscosity of the dough prior to baking.

Another and/or alternative non-limiting object of the present disclosure is the provision of a multi-layered food product wherein the batter layer, prior to baking, has a consistency and viscosity such that the batter can be poured about the dough layer during the formation of the multi-layered food product.

Another and/or alternative non-limiting object of the present disclosure is the provision of a multi-layered food product wherein the batter layer, prior to baking, constitutes about 8-70 wt. % of the multi-layered food product.

Another and/or alternative non-limiting object of the present disclosure is the provision of a multi-layered food product wherein the batter layer is formulated to create a delicate, light, and airy cake/quick bread-type layer when baked.

Another and/or alternative non-limiting object of the present disclosure is the provision of a multi-layered food product wherein the primary purpose of the batter layer is not to create structure for the multi-layered food product, but instead create a delicate, light, and airy cake/quick bread-type layer when baked to create or produce the desired texture, mouth feel, and/or organoleptic properties of the multi-layered food product.

Another and/or alternative non-limiting object of the present disclosure is the provision of a multi-layered food product wherein the thickness of the batter layer and the dough layer after the multi-layered food product has been fully baked are different.

Another and/or alternative non-limiting object of the present disclosure is the provision of a multi-layered food product wherein the thickness of the dough layer is less than the thickness of the batter layer.

Another and/or alternative non-limiting object of the present disclosure is the provision of a multi-layered food product wherein the thickness of the batter layer after the multi-layered food product has been fully baked is at least twice the thickness of the dough layer.

Another and/or alternative non-limiting object of the present disclosure is the provision of a multi-layered food product wherein the thicker batter layer is important to the multi-layered food product to create the desired texture, mouth feel, and organoleptic properties of the multi-layered food product.

Another and/or alternative non-limiting object of the present disclosure is the provision of a multi-layered food product wherein the thinner dough layer provides a strong, thin, structural inner layer that provides structure to the filling and to the multi-layered food product so that that the multi-layered food product can be eaten by hand after being fully baked, and the thicker batter layer is used to form a light and airy soft layer about the dough layer to create the desired feel, texture, and mouth feel of the multi-layered food product when held and eaten by the user.

Another and/or alternative non-limiting object of the present disclosure is the provision of a multi-layered food product wherein the dough layer is shaped to include one or more finger members that project outwardly from the surface of the dough (e.g., extending about 0.1-0.5 in. from the outer surface of the dough layer) that are configured to facilitate in securing the baked batter layer to the dough layer and/or to ensure that the thickness of the batter layer about the dough layer is generally uniform.

Another and/or alternative non-limiting object of the present disclosure is the provision of a multi-layered food product wherein the multi-layered food product is formed using an automated assembly line system.

Another and/or alternative non-limiting object of the present disclosure is the provision of a method for forming a multi-layered food product that includes a) providing a filling, b) providing a dough layer, c) partially or fully encapsulating the filling in the dough layer, d) partially or fully baking the dough layer, and e) optionally packaging and/or freezing the multi-layered food product.

Another and/or alternative non-limiting object of the present disclosure is the provision of a method for forming a multi-layered food product that includes a) providing a filling, b) providing a dough layer, c) partially or fully encapsulating the filling in the dough layer, d) optionally applying one or more toppings to the dough layer, e) partially or fully baking the dough layer, and f) optionally packaging and/or freezing the multi-layered food product.

Another and/or alternative non-limiting object of the present disclosure is the provision of a method for forming a multi-layered food product that includes a) providing a filling, b) providing a dough layer, c) partially or fully encapsulating the filling in the dough layer, d) partially or fully baking the dough layer, e) providing a batter layer, f) partially or fully encapsulating the dough layer within the batter layer that includes the filling after the dough layer has been partially or fully baked, g) partially or fully baking the batter layer, and h) optionally packaging and/or freezing the multi-layered food product.

Another and/or alternative non-limiting object of the present disclosure is the provision of a method for forming a multi-layered food product that includes a) providing a filling, b) providing a dough layer, c) partially or fully encapsulating the filling in the dough layer, d) partially or fully baking the dough layer, e) providing a batter layer, f) partially or fully encapsulating the dough layer within the batter layer that includes the filling after the dough layer has been partially or fully baked, g) optionally applying one or more toppings to the batter layer h) partially or fully baking the batter layer, and i) optionally packaging and/or freezing the multi-layered food product.

Another and/or alternative non-limiting object of the present disclosure is the provision of a method for forming a multi-layered food product wherein the dough layer is baked for a time period such that the dough layer is 50-100% fully baked.

Another and/or alternative non-limiting object of the present disclosure is the provision of a method for forming a multi-layered food product wherein the dough layer is baked for a time period such that the dough layer is 50-100% fully baked prior to the dough layer being at least partially coated with a batter layer.

Another and/or alternative non-limiting object of the present disclosure is the provision of a method for forming a multi-layered food product wherein the batter layer is baked for a time period such that the batter layer is 50-100% fully baked.

Another and/or alternative non-limiting object of the present disclosure is the provision of a method for forming a multi-layered food product further including the step of partially or fully proofing the dough layer prior to the partial or full baking of the dough layer.

Another and/or alternative non-limiting object of the present disclosure is the provision of a method for forming a multi-layered food product further including the step of shaping the dough layer after the dough layer has partially or fully encapsulated the filling and prior to the partial or full baking of the dough layer.

Another and/or alternative non-limiting object of the present disclosure is the provision of a method for forming a multi-layered food product wherein the average height to maximum width ratio of the shaped dough layer is generally 1:2.

Another and/or alternative non-limiting object of the present disclosure is the provision of a method for forming a multi-layered food product further including the step of pouring the batter over the dough layer that includes the filling and after the dough layer has been partially or fully baked so as to partially or fully encapsulate the dough layer with the batter so that a batter layer can be formed partially or fully about the dough layer.

Another and/or alternative non-limiting object of the present disclosure is the provision of a method for forming a multi-layered food product further including the step of pouring the batter over the dough layer that includes the filling and after the dough layer has been proofed and partially or fully baked so as to partially or fully encapsulate the dough layer with the batter so that a batter layer can be formed partially or fully about the dough layer.

Another and/or alternative non-limiting object of the present disclosure is the provision of a method for forming a multi-layered food product including the use of a cooking surface that can form an enclosed cavity about the dough layer of the multi-layered food product during the partial or full baking of the dough layer.

Another and/or alternative non-limiting object of the present disclosure is the provision of a method for forming a multi-layered food product including the use of a cooking surface that includes first and second plates that when placed together can form an enclosed cavity about the dough layer of the multi-layered food product during the partial or full baking of the dough layer.

Another and/or alternative non-limiting object of the present disclosure is the provision of a method for forming a multi-layered food product including the use of a first cooking surface that is provided so that the batter can be poured onto the surface of the cooking surface, and thereafter, the partially or fully baked dough layer that includes the filling is placed onto the batter on the cooking surface, and thereafter, additional batter is poured over the dough layer to partially of fully encapsulate the dough layer with the batter, and thereafter, a second cooking surface is positioned over the batter covered top surface of the dough layer to encapsulate the multi-layered food product within a cavity form by the first and second cooking surfaces, and wherein the two cooking surfaces are used to partially or fully bake the batter to form a batter layer partially or fully about the dough layer.

Another and/or alternative non-limiting object of the present disclosure is the provision of a method for forming a multi-layered food product wherein during the batter cooking process, the first and second cooking plates are rotated about a central axis of the multi-layered food product to facilitate in the even distribution of the batter about the dough layer during the partial or full baking of the batter.

Another and/or alternative non-limiting object of the present disclosure is the provision of a method for forming a multi-layered food product further including the step of packaging, freezing and storing the multi-layered food product after the batter has been partially or fully baked.

Another and/or alternative non-limiting object of the present disclosure is the provision of a method for forming a multi-layered food product further including the step of heating the frozen multi-layered food product by a) allowing the multi-layered food product to warm in an ambient temperature environment (e.g., placed on a countertop in a kitchen wherein the ambient temperature is 60-100° F. etc.) and then eaten when sufficiently warmed in the ambient temperature environment, b) heating in a microwave oven to heat the multi-layered food product to a desired eating temperature, c) heating in a combination of a microwave oven and oven or toaster oven wherein the microwave oven is used to heat the filling and the oven or toaster oven is used to toast the multi-layered food product exterior, d) heated in an oven or toaster oven or on a heating plate or stove top to heat the multi-layered food product to a desired eating temperature.

Another and/or alternative non-limiting object of the present disclosure is the provision of optionally covering the multi-layered food product in ovenable crisping overwrap packaging film (e.g., vented overwrap packaging film) prior to being heated within an oven or toaster oven to increase crisping and/or to prevent over-baking and drying out the multi-layered food product.

Another and/or alternative non-limiting object of the present disclosure is the provision of a multi-layered food product that has a batter layer formed about the dough layer to substantially or fully encapsulate the dough layer, and include one or more toppings on the batter layer, which batter layer encapsulates the dough layer of the multi-layered food product.

Another and/or alternative non-limiting object of the present disclosure is the provision of a multi-layered food product that has one or more toppings that constitutes about 0.1-15 wt. % (and all values and ranges therebetween) of the multi-layered food product.

Another and/or alternative non-limiting object of the present disclosure is the provision of a multi-layered food product that has one or more toppings that constitutes about 3-7 wt. % of the multi-layered food product.

Another and/or alternative non-limiting object of the present disclosure is the provision of a multi-layered food product that has one or more toppings that improves the taste, flavor impact, and appearance of the multi-layered food product.

Another and/or alternative non-limiting object of the present disclosure is the provision of a multi-layered food product that has one or more toppings that are comingled and bonded to the batter layer to inhibit or prevent 1) release of the one or more toppings from the batter layer, and/or 2) mess and cleanup.

Another and/or alternative non-limiting object of the present disclosure is the provision of a multi-layered food product that has one or more toppings that are at least partially caramelized when the dough layer or batter layer are partially or fully baked, and wherein the caramelization of the one or more toppings 1) provides additional flavor impact to the multi-layered food product, 2) provides better more appetizing appearance to the multi-layered food product, and/or 3) improves the bonding of the caramelized topping to the dough layer or the batter layer.

According to another non-limiting aspect of the disclosure, the one or more toppings can be applied by 1) sprinkling the one or more toppings by hand onto the dough layer or batter layer, b) using a topping hand-shaker with various diameter openings on the lids or top of the shakers to control the amount of the one or more toppings being applied to the dough layer or batter layer, and/or c) using any commercially available topping applicator machine(s) to apply the one or more toppings to the dough layer or batter layer.

According to another non-limiting aspect of the disclosure, the one or more topping are applied to the wet batter layer prior to the baking of the batter layer so that the one or more toppings 1) better adhere to the batter layer before the baking of the batter layer to cause the one or more toppings to be bonded permanently to the batter layer, and/or 2) cause the one or more toppings to be partially or fully embedded in the batter layer so as to improve bonding of the one or more toppings to the batter layer after the partial or full baking of the batter layer.

These and other advantages of the present disclosure will become more apparent to those skilled in the art from a review of the description of the preferred embodiment and claims.

BRIEF DESCRIPTION OF THE DRAWINGS

The foregoing and other features of the present disclosure will become apparent upon reading the following description with reference to the accompanying drawings, in which:

FIG. 1C is a perspective view of a multi-layered food product in accordance with another aspect of the present disclosure;

FIG. 1D is a cross-sectional view taken along Line 1D-1D in FIG. 1C;

FIG. 2E is a perspective view of a multi-layered food product in accordance with another aspect of the present disclosure;

FIG. 2F is a cross-sectional view taken along Line 2F-2f in FIG. 2E;

FIG. 3C is a perspective view of a multi-layered food product in accordance with another aspect of the present disclosure;

FIG. 3D is a cross-sectional view taken along Line 3D-3D in FIG. 3C;

FIG. 4 is a process flow diagram illustrating a method for forming a multi-layered food product according to another aspect of the present disclosure;

FIG. 9A is a side view of the lid member shown in FIG. 8A;

FIG. 9B is a top view of the lid member shown in FIG. 9A;

FIG. 10A is a side view of the receptacle member shown in FIG. 8A;

FIG. 10B is a top view of the receptacle member shown in FIG. 10A;

DETAILED DESCRIPTION OF NON-LIMITING EMBODIMENTS

Figure 1A:
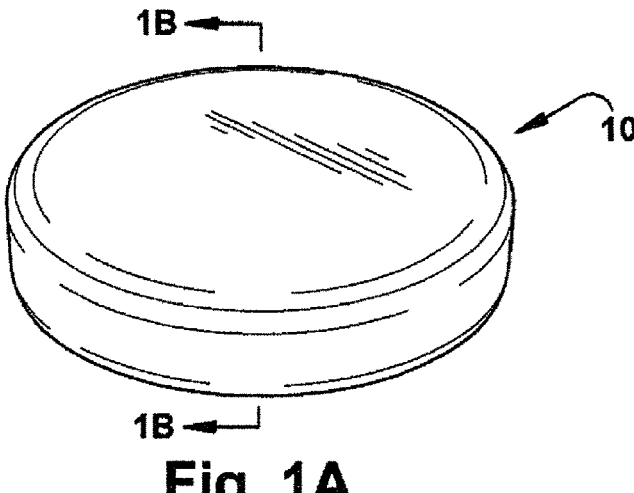
FIG. 1A is a perspective view of a multi-layered food product in accordance with one aspect of the present disclosure.

A more complete understanding of the articles/devices, processes, and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

Percentages of ingredients and components of the multi-layered food product should be assumed to be percent by weight of the stated element, unless expressly stated otherwise.

The present disclosure relates generally to filled food products, and more particularly to a multi-layered food product and method for forming the multi-layered food product. As representative of one aspect of the present disclosure, FIGS. 1A-2E illustrate several non-limiting embodiments of a multi-layered food product 10 or 10' that combines the strength and functionality of yeast-leavened bread with the delicate eating quality of a quick bread or cake. Unlike conventional filled food products, the multi-layered food product 10 or 10' of the present disclosure combines a yeast-leavened dough insert 12 or 12', which provides structural integrity to the product to facilitate eating by hand, with a batter 14 that gives the product a soft and appealing eating quality, which is absent in purely yeast-leavened bread products. The multi-layered food product can optionally include one or more toppings 13 that combines and/or bonds with the batter layer 14 that gives the multi-layered food product improved taste, more impactful flavor, and a more craft, home-made and/or artisan appearance. Additionally, the multi-layered food product 10 or 10' can be optionally initially warmed in a microwave and then heated in an oven or toaster to yield a food product having a crispy exterior and a soft interior without the chewy or tough consistency of a typical yeast-leavened bread product.

The multi-layered food product 10 or 10' has a molded configuration (e.g., puck-shaped). Although a puck-shaped configuration is shown, the multi-layered food product 10 or 10' can have other shapes, such as rectangular, circular, ovoid, square, triangular, cylindrical, star, or any other polygonal shape. The puck-shaped configuration of the multi-layered food product 10 or 10' gives the multi-layered food product 10 or 10' the appearance of a home-baked meal or snack that has been prepared on a griddle, pan or panini. Although the multi-layered food product 10 or 10' is shown as having a puck-shaped configuration, it will be appreciated that the product can have any desirable shape and size that makes the multi-layered food product versatile and easy to consume. For example, the multi-layered food product 10 or 10' can have any shape and size that enables a consumer to easily eat the multi-layered food product at home or on-the-go without any mess. The molded configuration of the multi-layered food product 10 or 10' also allows the product to be quickly and easily heated for consumption in a microwave and/or toaster, or simply in an oven.

Figure 1B:
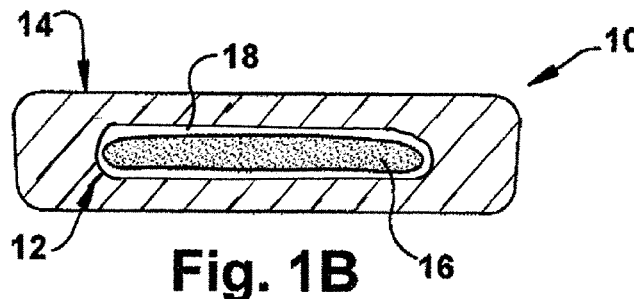
FIG. 1B is a cross-sectional view taken along Line 1B-1B in FIG. 1A.

As shown in FIG. 1B, the multi-layered food product 10 comprises a partially or fully baked insert 12 that includes a filling 16, which filling is substantially (e.g., more than 50%, at least about 60%, at least about 70%, at least about 80% or at least about 90%) or completely enveloped or encapsulated by a dough 18. The dough is at least partially fully baked (baked 50-99% of full baked) or fully baked. The baked insert 12 is substantially or completely enveloped or encapsulated by a batter layer 14. As illustrated in FIGS. 1C-1D and 2E-2F, the batter layer 14 can be topped by one or more toppings 13. The one or more toppings can include flavored powders, seasonings, crumbs or clusters, grated cheeses, sugars, vegetables, fruits, eggs, and/or any other food topping. Butter and/or oil can be optionally applied to the one or more toppings (e.g., spray coating, brush coating, etc.) to facilitate in the partial or full caramelization of one or more of the toppings during the baking process, and to help prevent the toppings from sticking to the baking cavity. The butter and/or oil can be applied prior to, during or after the one or more toppings are applied to the batter layer.

The baked insert 12 or 12' has a molded configuration (e.g., a puck-like shape, cylindrical-shaped, cube-shaped, etc.). As noted above, the baked insert 12 or 12' additionally includes a filling 16 that is substantially or completely enveloped or encapsulated by the dough 18. The filling 16 can comprise any desired solid or semi-solid food product that is typically included as part of a meal or snack. Non-limiting examples of fillings 16 can include, but are not limited to, fruit, cheese, eggs, meat (e.g., ham, bacon, sausage, hamburger, chicken, turkey, etc.), plant based meat, tofu, vegetables, sauces, gravy, nuts, seeds, caramel, butterscotch, chocolate, fudge, confectionary, custard, pudding, marshmallow filling, and/or a combination thereof.

The multi-layered food product 10 or 10' combines the distinctive structural and taste characteristics of yeast- and chemically-leavened breads into a single, seamless, food product. Yeast-leavened breads use fermentation to create carbon dioxide "bubbles" and thereby leaven the dough. Fermentation begins by mixing the ingredients together to develop a strong gluten structure, which allows the dough to accumulate carbon dioxide. Leavening continues to occur in the proofing stage, in which a low-heat and high-humidity environment promotes optimal yeast fermentation. Yeast leavening is highly regarded as contributing desirable tastes and aromas to bread. For example, yeast-leavened breads tend to have a smooth and strong outer crust and airy, flaky interiors, which are structural and tough.

Chemically-leavened breads, also known as "quick breads", are formed by the reaction of bicarbonate compounds with acid-reactive ingredients. Sodium bicarbonate is the most commonly used chemical-leavening agent, but potassium and ammonium bicarbonates are also used. Chemical leavening typically occurs in two stages. The first stage releases carbon dioxide during mixing, while the second stage releases carbon dioxide during the baking process by the activation of certain chemical-leavening ingredients. One advantage of chemical leavening is the quick formation of carbon dioxide bubbles within a dough or batter mixture, without the need for proofing. Unlike yeast-leavened breads, quick breads are known for having a slightly coarse texture, soft, cake-like qualities, and soft crusts.

The weight percent of the batter 14, the optional topping 13, the filling 16, and the dough 18 can be varied to impart the multi-layered food product 10 or 10' with the desired structural, appearance, and/or taste characteristics. In one non-limiting example of the present disclosure, the filling 16 can be about 15-75 wt. % of the total weight of the multi-layered food product 10 or 10', the dough 18 can be about 10-60 wt. % of the total weight of the multi-layered food product, the batter layer 14 can be about 15-60 wt. % of the total weight of the multi-layered food product, and the optional topping layer can be about 2-15 wt. % of the total weight of the multi-layered food product. In another non-limiting example of the present disclosure, the filling 16 weight can be about 38-48 wt. % of the total weight of the multi-layered food product, the dough layer 18 can be about 12-22 wt. % of the total weight of the multi-layered food product, the batter layer 14 can be about 29-39 wt. % of total weight of the multi-layered food product, and the optional topping layer 13 can be about 1-11 wt. % of the total weight of the multi-layered food product.

The leavening agents and/or other ingredients used to form the batter layer 14 (e.g., chemically-leavened batter layer) and the dough layer 18 (e.g., yeast-leavened dough layer) can also be varied depending upon the particular structural and taste characteristics of the multi-layered food product 10 or 10'. For example, the weight percent of the yeast in the yeast-leavened dough 18 can be about 1-6 wt. %. Additionally, one or a combination of chemical-leavening agents (e.g., baking powder) can be used to form the batter layer 14. For example, the weight percent of the chemical-leavening agent (e.g., baking powder) in the batter layer 14 can be about 0-8 wt. %.

As illustrated in FIG. 1D, the thickness of the batter layer 14 is generally thicker than the dough layer 18. In one non-limiting configuration, the thickness of the batter layer 14 is generally 10-1000% thicker (and all values and ranges therebetween) than the dough layer 18.

FIGS. 2A-F illustrate a multi-layered food product 10' according to another aspect of the present disclosure. The multi-layered food product 10' can have a molded configuration (e.g., puck-shaped). Although the multi-layered food product 10' is shown as having a puck-shaped configuration, it will be appreciated that the product can have any desirable shape and size that makes the product versatile and easy to consume.

Figure 2A:
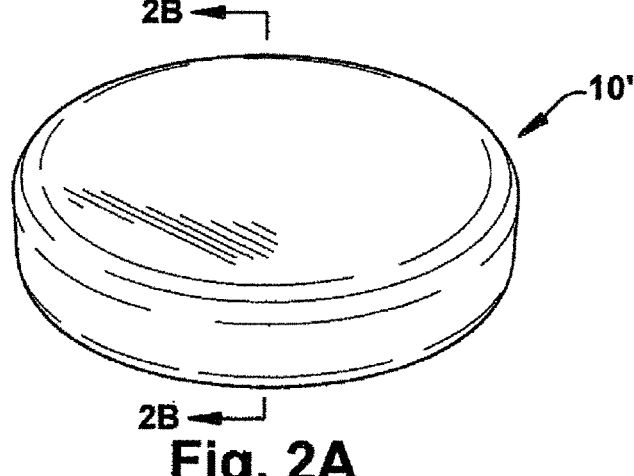
FIG. 2A is a perspective view of a multi-layered food product in accordance with another aspect of the present disclosure.
Figure 2B:
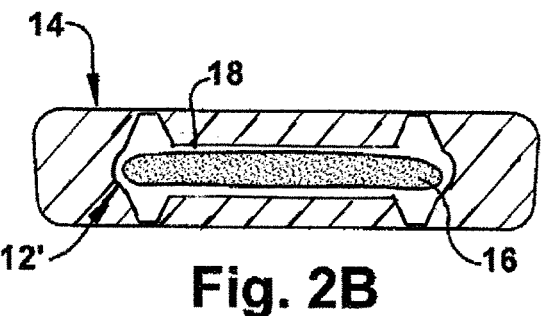
FIG. 2B is a cross-sectional view taken along Line 2B-2B in FIG. 2A.
Figure 2C:
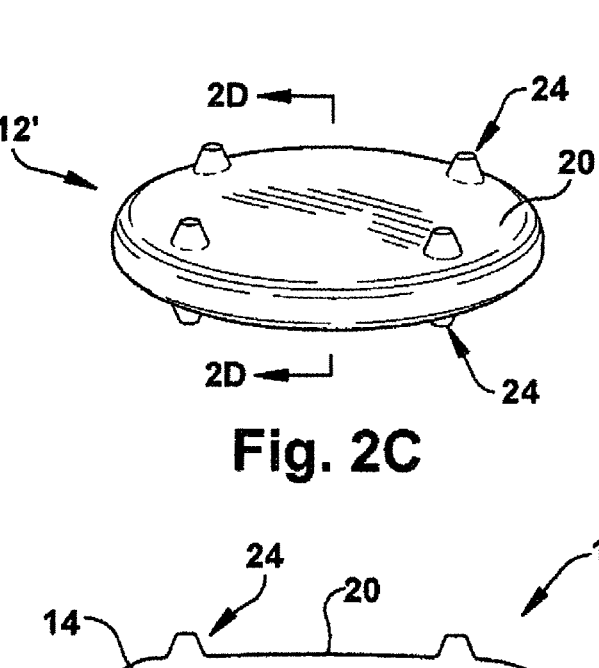
FIG. 2C is a perspective view of a substantially baked insert comprising a portion of the multi-layered food product in FIGS. 2A-B and 2E-F.
Figure 2D:
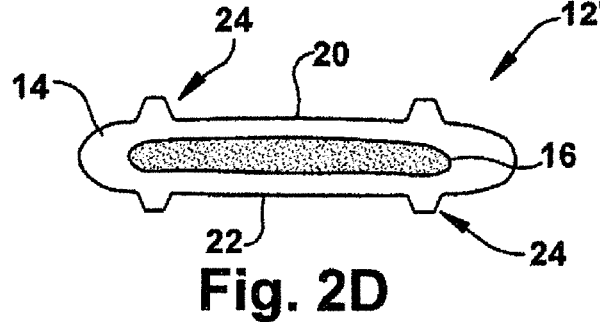
FIG. 2D is a cross-sectional view taken along Line 2D-2D in FIG. 2C.

As shown in FIGS. 2A-F, the substantially baked insert 12' has a molded configuration and is defined by oppositely disposed first and second major surfaces 20 and 22. At least one of the first and second major surfaces 20 and 22 can include a finger member 24 that projects outwardly from at least one of the first and second major surfaces. As shown in FIG. 2C, for example, each of the first and second major surfaces 20 and 22 can include a plurality of finger members 24. The finger members 24 generally serve to secure the substantially baked insert 12' within the batter layer 14 and prevent the insert from "sinking" to either side of the multi-layered food product 10'. It should be appreciated that, where desired, the first and/or second major surfaces 20 and 22 may not include any finger members 24.

The finger members 24 are formed from the dough 18 and are dispersed about the first and second major surfaces 20 and 22. The finger members 24 can be dimensioned (e.g., have a sufficient height, width, and thickness) to keep the substantially baked insert 12' from sinking to either side of the multi-layered food product 10'. The finger members 24 may or may not be visible about the multi-layered food product 10'. The finger members 24 can be symmetrically or asymmetrically dispersed about the first major surface 20 and/or the second major surface 22. The finger members 24 can have any desired shape or configuration, such as the dome-shaped configuration shown in FIG. 2C. Although not shown, it will be appreciated that one or more of the finger members 24 can alternatively have a ridge-like configuration that extends across all or only a portion of the first major surface 20 and/or the second major surface 22.

As illustrated in FIG. 1D, the thickness of the batter layer 14 is generally thicker than the dough layer 18 (which is absent the finger members). In one non-limiting configuration, the thickness of the batter layer 14 is generally 10-1000% thicker (and all values and ranges therebetween) than the dough layer 18 (which is absent the finger members).

Referring now to FIGS. 3A-D, there is illustrated a multi-layered food product 10" according to another aspect of the present disclosure. The multi-layered food product 10" can have a molded configuration (e.g., puck-shaped). Although the multi-layered food product 10" is shown as having a puck-shaped configuration, it will be appreciated that the product can have any desirable shape and size that makes the product versatile and easy to consume. For example, the multi-layered food product 10" can have any shape and size that enables a consumer to easily eat the multi-layered food product at home or on-the-go without any mess. The molded configuration of the multi-layered food product 10" also allows the product to be quickly and easily reconstituted for consumption in a microwave and/or toaster, or simply heated in an oven.

Figure 3A:
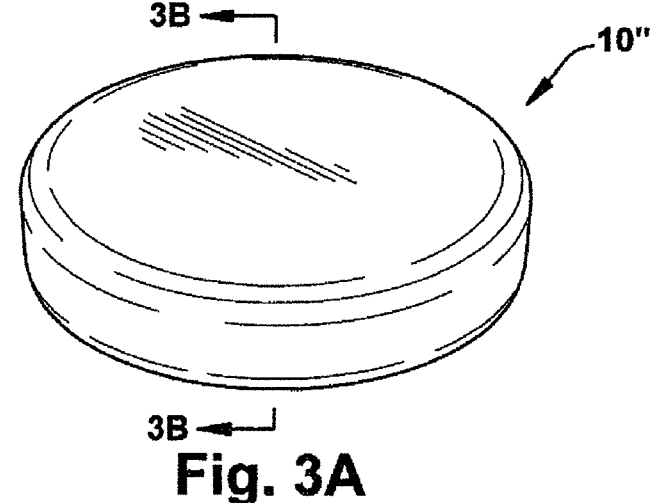
FIG. 3A is a perspective view of a multi-layered food product in accordance with another aspect of the present disclosure.
Figure 3B:
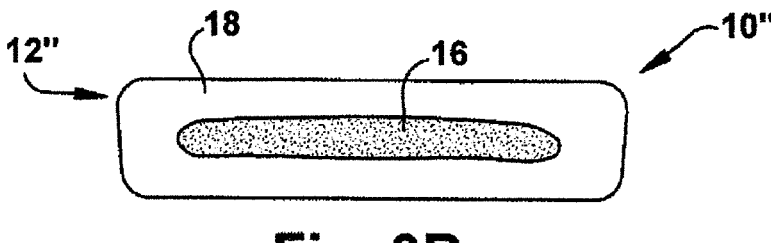
FIG. 3B is a cross-sectional view taken along Line 3B-3B in FIG. 3A.

As shown in FIG. 3B, the multi-layered food product 10" can comprise an insert 12" including a filling 16 that is substantially or completely enveloped or encapsulated by a dough 18, and optionally one or more toppings 13 as illustrated in FIG. 3C that can include flavored powders, seasonings, crumbs or clusters, grated cheeses, sugars, vegetables, fruits, eggs or any other food toppings. As described above, the filling 16 can include any desired solid or semi-solid food product that is typically included as part of a meal (e.g., fruit, cheese, eggs, meat, vegetables, sauces, and/or a combination thereof) or snack. The multi-layered food product 10" illustrated in FIGS. 3A-D only includes a single dough layer (e.g., yeast-leavened dough layer or chemically-leavened dough layer), a filling that is partially or fully encapsulated by the dough layer, and an optional topping on the outer surface of the dough layer.

The weight percent of the filling 16, the dough 18, and the optional topping layer 13 can be varied to impart the multi-layered food product 10" with desired structural and taste characteristics. In one example of the present disclosure, the filling 16 can be about 15-75 wt. % of the total weight of the multi-layered food product 10" and the dough layer 18 can be about 25-75 wt. % of the total weight of the multi-layered food product, and the optional topping layer 13 can be about 1-11 wt. % of the total weight of the multi-layered food product. In another non-limiting example of the present disclosure, the filling layer 16 in the multi-layered food product 10" can be about 55-65 wt. % of the multi-layered food product, the dough layer 16 of the multi-layered food product 10" can be about 30-40 wt. % of the multi-layered food product, and the optional topping 13 of the multi-layered food product 10" can be 0-10 wt. % of the multi-layered food product.

As illustrated in FIGS. 4, 5, 6, 11, 12, and 13, another aspect of the present disclosure includes a method 30 and apparatus for forming a multi-layered food product 10 or 10' or 10". The method 30 can be performed using an automated assembly line system (FIGS. 5, 6, and 13) comprising first and second automated assembly lines 50 and 52, and automated line 200.

The first automated assembly line 50 is for preparing the substantially baked insert 12 or 12' or 12" and comprises a series of upper and lower loop-shaped tracts 54 and 56, a portion of each of which is disposed within an oven 58. The upper and lower tracts 54 and 56 of the first automated assembly line 50 include a plurality of first baking plates 60 securely mounted thereto that can be securely mated together to form a plurality of first bi-molded plate assemblies 62 (FIGS. 7A-B).

Figure 7A:
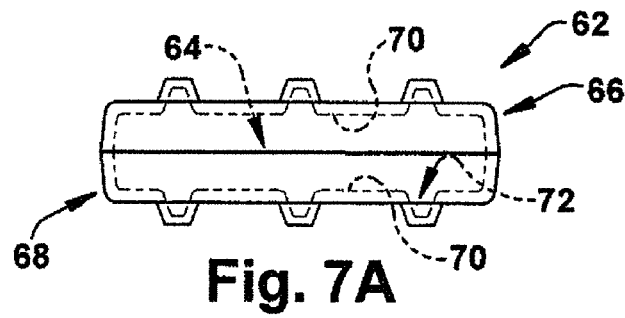
FIG. 7A is a perspective view of a first bi-molded plate assembly for forming the substantially baked insert in FIGS. 2A-D.
Figure 7B:
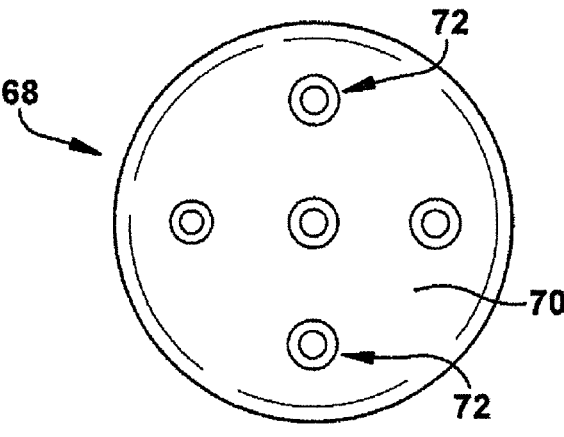
FIG. 7B is a top view of a second baking plate of the first bi-molded plate assembly in FIG. 7A.

As shown in FIGS. 7A-B, each of the first bi-molded plate assemblies 62 formed by each of the first baking plates 60 have a puck- or disc-shaped configuration and form a cavity 64 therebetween. As can be appreciated, the cavity can have other shapes (e.g., cylindrical shaped, waffle-shaped, disc or saucer-shaped body, star-shaped, cube-shaped, box-shaped, etc.). The cavity 64 is defined by first and second plates 66 and 68. The dimensions (e.g., height, width, length, cavity depth, etc.) of the first and second plates 66 and 68 can be about equal so that the dimensions of the substantially baked insert 10 or 10' formed by the method 30 are also about equal.

When the puck includes one or more finger members 24, an inner surface 70 of one or both of the first and second plates 66 and 68 can include one or more depressions 72 for forming the finger members 24. For example, each of the depressions 72 can have a dome-shaped configuration for producing finger members 24 having a configuration as shown in FIGS. 2A-E. It will be appreciated that the depressions 72 can have any configuration for forming finger members 24 with any corresponding desired configuration.

When the puck is absent one or more finger members 24 as illustrated in FIGS. 1A-1D, the inner surface 70 of the first and second plates 66 and 68 is absent the one or more depressions 72.

All or only a portion of each of the first bi-molded plate assemblies 62 can be made of a rigid, heat-conductive material (e.g., a metal or metal alloy), and the baking surface can optionally be coated with a non-stick baking surface such as Teflon or silicone.

During the partial or full baking of the dough layer 18 of the insert 10 or 10', the cavity formed by the first and second plates partially or fully entraps gasses (e.g., $CO_2$, water vapor, etc.) in the cavity, thereby increasing the pressure in the cavity during the partial or full baking of the dough layer, which can 1) increase the rate of baking of the dough layer, 2) enhance the properties of the dough layer (e.g., dough strength), and/or 3) increase the moisture content of the partially or fully baked dough layer. The cavity also is used to maintain the shape of the insert 10 or 10' during the partial or full baking of the dough layer. The closed cavity can also result in a portion of the inner surface of the cavity pressing the one or more toppings partially or fully into the dough layer, thereby facilitating in the securing of the one or more toppings to the dough layer; however, this is not required.

When the multi-layered food product 10" is to be formed as illustrated in FIGS. 3A-3D, only the first automated assembly line 50 or only the second automated assembly line 52 is used to form the multi-layered food product 10". When multi-layered food product 10 or 10' is to be formed as illustrated in FIGS. 1A-1D and 2A-2F, a second automated assembly line 52 is used in combination with the first automated assembly line 50 for preparing the multi-layered food product 10 or 10'.

Figure 5:
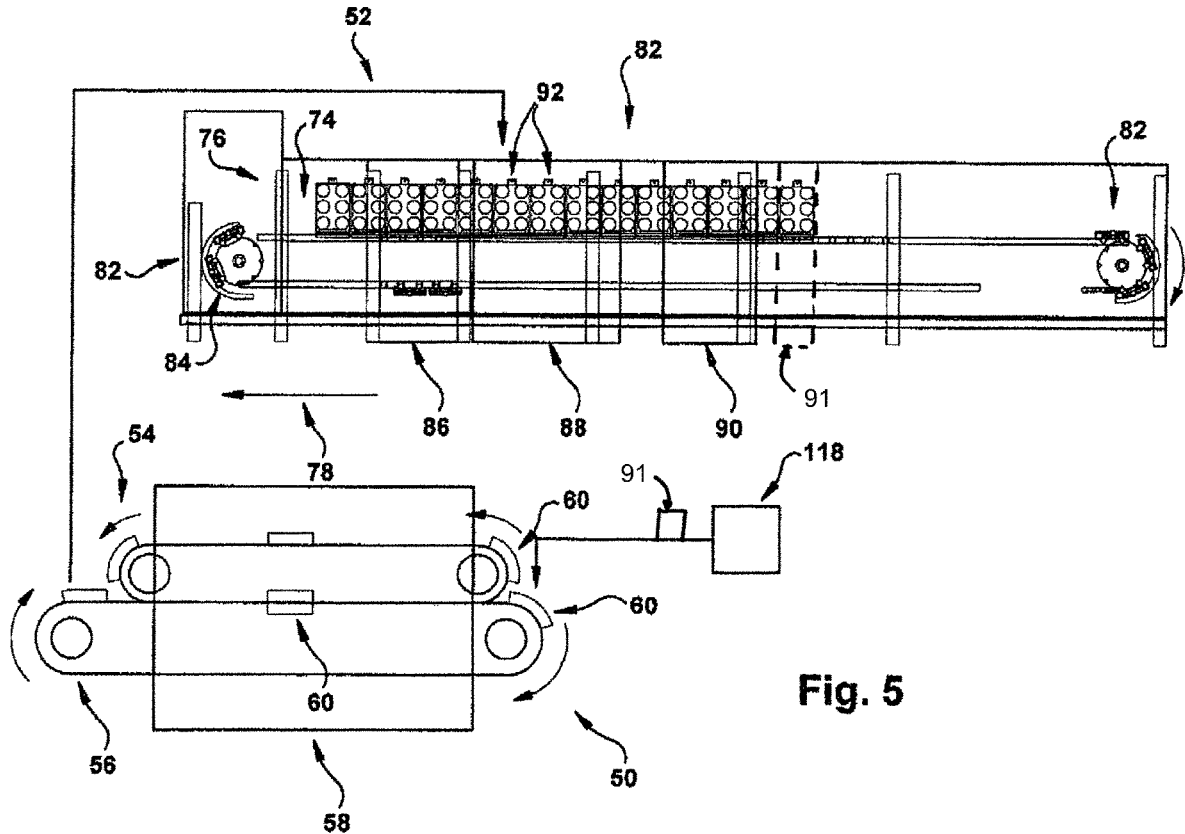
FIG. 5 is a schematic diagram showing an automated assembly line system used to form the multi-layered food product of the present disclosure.
Figure 6:
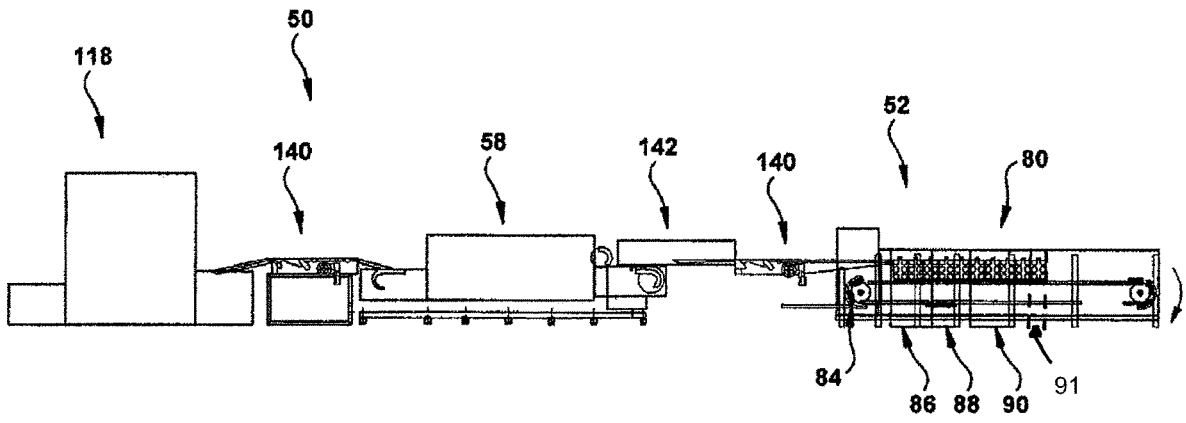
FIG. 6 is a schematic diagram showing an alternative configuration of the automated assembly line system in FIG. 5.

As shown in FIGS. 5 and 6, the second automated assembly line 52 is for preparing the multi-layered food product 10 or 10' or 10" and comprises a continuous, loop-shaped tract 74 having an upper portion 76 and a lower portion 78. A portion of the second assembly line 52 is seated within an oven 80. The tract 74 of the second assembly line 52 is operably mated to opposing rotation members 82, each of which is separately or jointly powered by a power source (not shown). As described in greater detail below, the second assembly line 52 also includes an automatic removing system 84, a first batter/dough injector 86, an insert feeding system 88, a second batter injector 90, and can optionally include a topping applicator 91 (See FIG. 5).

Figure 8A:
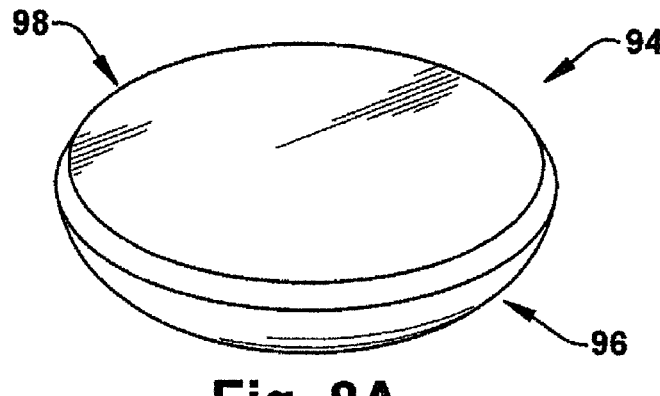
FIG. 8A is a perspective view of a second bi-molded plate assembly for forming the multi-layered food product in FIGS. 1A-2D, the second bi-molded plate assembly comprising a lid member and a receptacle member.
Figure 8B:
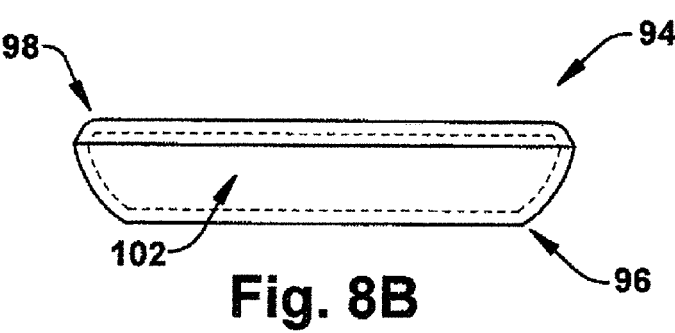
FIG. 8B is a side view of the second bi-molded plate assembly in FIG. 8A.

The second assembly line 52 also includes a plurality of second baking plates 92, each of which includes at least one of a second bi-molded plate assembly 94 (FIGS. 8A-B). As shown in FIG. 5, the second assembly line 52 includes fourteen second baking plates 92 having six of the second bi-molded plate assemblies 94 in each. It will be appreciated that the number of the second baking plates 92, as well as the number of the second bi-molded plate assemblies 94 comprising each of the second baking plates, can be varied depending upon production needs and the configuration of the second assembly line 52.

As shown in FIGS. 8A-B, the second bi-molded plate assemblies 94 comprises a receptacle member 96 and a lid member 98. All or only a portion of each of the second bi-molded plate assemblies 94 can be made of a rigid, heat-conductive material (e.g., a metal or metal alloy). The receptacle member 96 and the lid member 98 each have a generally circular or oval-shaped configuration and include a cavity 100 (FIGS. 9A and 10A). When the receptacle member 96 (FIG. 8B) and the lid member 98 are securely mated with one another, the cavities 100 of the lid member and the receptacle member form a molded, closed baking cavity 102. The shape of the closed cavity is non-limiting (e.g., puck-shaped, cylindrical-shaped, waffle-shaped, disc- or saucer-shaped, star-shaped, cube-shaped, box-shaped, etc.). The molded, closed baking cavity 102 can have a diameter of about 6 cm to about 15 cm, and a depth of about 1 cm to about 5 cm; however, it can be appreciated that other sizes can be used. As illustrated in FIGS. 9A and 10A, receptacle member 96 has a larger cavity 100 and receptacle member 98 has a smaller cavity 100 such that the majority of closed baking cavity 102 is formed by cavity 100 of receptacle 96. However, it can be appreciated that cavities 100 can be generally the same size as illustrated in the cavity 64 formed by first and second plates 66 and 68 as illustrated in FIGS. 7A and 7B.

The molded, closed baking cavity 102 is designed to hold and bake the components of the multi-layered food product 10 or 10' or 10" concurrently. Accordingly, the flavor of the multi-layered food product 10 or 10' of 10" is enhanced through the process of baking the product components within the molded baking cavity 102. In addition to the leavening power that the multi-layered food product 10 or 10' or 10" receives from the yeast-leavened dough 18 and/or the chemically-leavened batter 14, the multi-layered food product receives further leavening from the steam generated within the sealed molded baking cavity 102 during the baking process. Also, the increased pressure generated in the closed cavity due to the generation of gasses (e.g., steam, $CO_2$, etc.) during the partial or full baking of the multi-layered food product in the closed baking cavity 102 can facilitate in the bonding of one or more optional toppings 13 to the top surface of the dough layer (See FIG. 3D—multi-layered food product 10") or the batter layer (See FIGS. 1D, 2F—multi-layered food product 10 and 10'). The closed cavity baking container or vessel can also result in a portion of the inner surface of the cavity pressing the one or more toppings partially or fully into the dough layer, thereby facilitating in the securing of the one or more toppings to the dough layer; however, this is not required.

The lid member 98 (FIG. 9A) of each of the second bi-molded plate assemblies 94 has a disc-like shape and is defined by oppositely disposed first and second major surfaces 104 and 106. The first major surface 104 has a generally smooth, flat configuration that gradually tapers around the edge 108 towards the second major surface 106; however, this is not required. The second major surface 106 is adapted for mating with the receptacle member 96. As shown in FIG. 9A, the cavity 100 of the lid member 98 extends from the second major surface 106 towards the first major surface 104 such that the cavity is recessed within the second major surface. The cavity 100 of the lid member 98 defines a volume capable of holding up to about 50 vol. % of the multi-layered food product 10 or 10' or 10" during the baking process. In one non-limiting arrangement, the cavity 100 of the lid member 98 defines a volume capable of holding up to about 0-40 vol. % of the multi-layered food product 10 or 10' or 10" during the baking process. In another non-limiting arrangement, the cavity 100 of the lid member 98 defines a volume capable of holding up to about 5-30 vol. % of the multi-layered food product 10 or 10' or 10" during the baking process.

As shown in FIGS. 10A-B, the receptacle member 96 has a rounded, pan-shaped configuration; however, this is not required. The receptacle member 96 includes oppositely disposed first and second major surfaces 110 and 112 and an annular side wall 114 that extends between the first and second major surfaces. The cavity 100 of the receptacle member 96 extends between the first major surface 110 and the bottom surface 116 of the receptacle member. The cavity 100 of the receptacle member 96 defines a volume that can be equal to or greater than the volume of cavity 100 of lid member 98. The cavity 100 of the receptacle member 96 is capable of holding about 50-100 vol. % of the multi-layered food product 10 or 10' or 10" during the baking process.

It will be appreciated that one or more of the second bi-molded plate assemblies 94 can optionally include an imprinting surface (not shown in detail) for imparting all or only a portion of a surface of the multi-layered food product 10 or 10' or 10" with a decorative design. For example, one or more surfaces defining the cavity 100 of the second bi-molded plate assembly 94 can include at least one depressed and/or raised imprinting surface having a decorative or aesthetically pleasing design. The imprinting surface may additionally or optionally serve to securely position the substantially baked insert 12 or 12' during baking. For example, the imprinting surface may assist in maintaining the substantially baked insert 12 or 12' proportionally in the center of the cavity 100 during baking; however, this is not required.

Referring now to FIGS. 4, at Step 32, the method 30 can begin by heating the first baking plates 60 to a predetermined temperature (e.g., about 180-450° F.). Either prior to, contemporaneous with, or subsequent to Step 32, the raw components of the multi-layered food product 10 or 10' or 10" are prepared. For example, the dough 18 can be formed by scaling (e.g., measuring out) the needed ingredients, which may include flour (e.g., about 27% to about 68% of the total batch weight), water (e.g., about 21% to about 57% of the total batch weight), milk powder (e.g., about 0% to about 9% of the total batch weight), eggs (e.g., about 2% to about 15% of the total batch weight), gluten (e.g., about 2% to about 5% of the total batch weight), sugar (e.g., about 2% to about 15% of the total batch weight), oil (e.g., about 0% to 15% of the total batch weight), leavening agent [yeast and/or chemical-leavening agent] (e.g., about 1% to about 5% of the total batch weight), and salt (e.g., about 0.5% to about 2% of the total batch weight).

It will be appreciated that other ingredients may be added to adjust the flavor or improve the functionality of the dough 18. Examples of ingredients that can be added to adjust the flavor of the dough 18 can include butter, cheese, spices, natural flavorings, and fruit or nut inclusions. Examples of ingredients that may be added to improve the functionality of the dough 18 can include baking enzymes, mono and diglycerides, fats, and oils. After the ingredients are scaled, the ingredients are then mixed and kneaded together for a period of time sufficient to develop the gluten structure of the dough 18. The fully developed dough 18 is then ready for subsequent use. When forming multi-layered food product 10 or 10', dough 18 is generally a yeast-leavened dough.

When forming multi-layered food product 10", dough 18 can be a yeast-leavened dough or chemically-leavened dough or batter.

After preparing the dough 18, a measured amount of one or more fillings 16 is "encrusted" inside a measured amount of the dough to form the insert 12 or 12' or multi-layered food product 10". The measured amount of filling 16 may range from about 15 grams to about 99 grams, and the measured amount of the dough 18 may range from 12 grams to about 128 grams. After the filling 16 is encrusted inside the dough 18, the formed product generally comprises a ball-shaped insert 12 or 12' or multi-layered food product 10" that is substantially or completely enveloped by the dough and includes the filling at its center.

The insert 12 or 12' or multi-layered food product 10" can be passed through a molding or shaping device (not shown) so that upper and/or lower portions of the insert or multi-layered food product are partially flattened. The molded insert 12 or 12' or multi-layered food product 10" is optionally placed into a bakery proofing chamber 118 (FIG. 5) for a period of time sufficient to adequately "rise" or "proof" the insert prior to baking. If multi-layered food product 10" includes a chemically-leavened dough or batter 18, then the proofing chamber may not be used. For example, the proofing time can vary depending upon the type and size of the dough 18 and the filling 16. Generally, the proofing time is at least five minutes and typically about 10-60 minutes; however, longer proofing times can be used.

Either before, during, or after formation of the insert 12 or 12', the batter layer 14 is prepared. Creation of the batter layer 14 begins by scaling the necessary ingredients, which may include water (e.g., about 29% to about 68% of the total batch weight), flour (e.g., about 15% to about 40% of the total batch weight), eggs (e.g., about 5% to about 40% of the total batch weight), sugar (e.g., about 0% to about 17% of the total batch weight), milk powder (e.g., about 0% to about 12% of the total batch weight), oil (e.g., about 0% to about 15% of the total batch weight), leavening agent (0.5-8% the total batch weight (e.g., baking powder [e.g., about 0-5% of the total batch weight], baking soda [e.g., about 0-2% of the total batch weight], and/or yeast [e.g., about 0-8% the total batch weight]), and salt (e.g., about 0.5% to about 3% of the total batch weight). In one embodiment, the leavening agent in the batter layer 14 includes a chemical-leavening agent and less than 1 wt. % yeast, and typically 0 wt. % yeast.

It will be appreciated that other ingredients may be added to adjust the flavor or improve the functionality of the batter layer 14. Examples of ingredients that may be added to adjust the flavor of the batter layer 14 may include butter, butter flavor, cheese, meat, natural flavors or spices, fruits, nuts, and the like. Examples of ingredients that may be added to improve the functionality of the batter layer 14 may include oils, fats, emulsifiers, and the like.

After scaling the desired ingredients, the ingredients are then thoroughly mixed until they are adequately combined into a partially liquid form, typically in a large temperature-controlled stirring vat (not shown). The mixed ingredients may then be transferred to a second batter mixer, stirred at high speeds, and properly aerated. The resultant batter layer 14 may then be placed inside a temperature-controlled container (e.g., first and second batter injectors 86 and 90) that will be used to deposit the chemically-leavened batter during the baking process.

Either before, during, or after preparation of the batter 14, the ingredients for the optional topping layer 13 are prepared. To do so, each of the toppings ingredients is prepared by measuring out the flavored powders, seasonings, sugars, shredded cheese, or whatever toppings are to be deposited atop the multi-layered food product. The toppings are then held in the toppings applicator system 91 in preparation for the automated baking of the multi-layered food product.

Prior to, simultaneous with, or subsequent to preparation of the insert 12 or 12', the batter 14, and the optional topping ingredients 13, the insert can be partially or fully baked at Step 34. As shown in FIG. 5, an insert 12 or 12' is taken from the proofing chamber 118 and deposited into a first baking plate 60 (e.g., the second plate 68 of a first bi-molded plate assembly 62). It will be appreciated that the insert 12 or 12' can be deposited into the first baking plate 60 by any one or combination of suitable mechanisms, such as via a robotic arm, conveyor belt system 140 (FIG. 6), or by hand. Once the insert 12 or 12' is deposited into the first baking plate 60, the baking plate rotates about the lower tract to securely mate with another baking plate, thereby forming a plurality of first bi-molded plate assemblies 62. The bi-molded plate assemblies 62 fully encapsulate the insert 12 or 12' in the closed cavity 64 prior to the partial or full baking of the insert 12 or 12'.

As discussed above, multi-layered food product 10" can either be formed in first automated assembly line 50 or second automated assembly line 52. When the dough layer 18 is a yeast-leavened dough, the multi-layered food product 10" is generally formed by first automated assembly line 50, and the second automated assembly line 52 is not used. When the dough layer 18 is a chemically-leavened dough or batter, the multi-layered food product 10" is generally formed by a modified second automated assembly line 52, and the first automated assembly line 50 is not used.

If the multi-layered food product 10" is formed by first automated assembly line 50, one or more toppings can optionally be deposited on the outer surface of multi-layered food product 10" by optional topping depositor(s) 91 (FIG. 5) to form a topping layer 13 as illustrated in FIGS. 3C-3D. As illustrated in FIG. 5, the one or more toppings are applied to the outer surface of the dough layer after the dough layer has been proofed in proofing chamber 118 and prior to the dough being partially or fully baked in oven 58. The one or more toppings that are dispensed from the optional topping depositor(s) 91 result in 1-100% (and all values and ranges therebetween), typically 10-100%, and more typically 50-100% of the top surface of the dough layer 18 being covered by the one or more toppings 13. Generally, 0-50% (and all values and ranges therebetween) of the one or more toppings that are applied to the dough layer become partially or fully embedded in the dough layer prior to the baking of the dough layer.

If the multi-layered food product 10" is formed by second automated assembly line 52, one or more toppings can optionally be deposited on the outer surface of multi-layered food product 10" by optional topping depositor(s) 91 (FIG. 5) to form a topping layer 13 as illustrated in FIGS. 3C-3D. As illustrated in FIG. 5, the one or more toppings are applied to the outer surface of the dough layer prior to the dough layer being partially or fully baked in the oven.

Referring again to FIG. 5, the baking plates 60 move through an oven 58 (e.g., a tunnel oven) for a time and at a temperature sufficient to partially or fully bake insert 12 or 12'. The term "partially baked" means that the insert 12 or 12' or the multi-layered food product 10" is baked to at least about 10% of being fully baked, and typically 40-85% of being fully baked. The term "substantially baked" means that the insert 12 or 12' or the multi-layered food product 10" is baked to at least about 80% of being fully baked, and typically 80-99.9% of being fully baked.

In one non-limiting arrangement, the first baking plates 60 can move through oven 58 so that the insert 12 or 12' or the multi-layered food product 10" is partially or fully baked (i.e., 100% baked). For instance, the first baking plates 60 can move through oven 58 for a time of about 20-2000 seconds, typically 25-1000 second, and more typically 45-180 seconds and at a temperature of about 250-450° F. to partially or fully bake the insert 12 or 12' or the multi-layered food product 10".

After the first baking plates 60 pass through the oven 58, the baking plates are separated as shown in FIG. 5 so that the partially or fully baked insert 12 or 12' or the multi-layered food product 10" can be removed from the plates and deposited into the insert feeding system 88. It will be appreciated that the partially or fully baked insert 12 or 12' produced by the method 30 can be deposited into the insert feeding system 88 by any one or combination of mechanisms, such as a transfer machine 142 (FIG. 6) that removes the partially or fully baked insert 12 or 12' from the first baking plates 60 and then passes the insert onto a conveyor belt system 140. If the multi-layered food product 10" was formed by first automated assembly line 50, the transfer machine 142 can be optionally used to transfer the multi-layered food product 10" to a cooling location for an appropriate period of time before freezing, wrapping, and packaging. The packaged multi-layered food product 10 or 10' can be boxed and further frozen ahead of distribution to the marketplace.

Prior to depositing the substantially baked insert 12 or 12' into the insert feeding system 88, the second baking plates 92 (and thus each of the second bi-molded plate assemblies 94) are heated to a predetermined temperature (e.g., about 275-450° F.) at Step 36. Upon heating each of the second bi-molded plate assemblies 94 to the predetermined temperature and forming the components of the multi-layered food product 10 or 10', the second assembly line 52 is activated so that the tract 74 progressively moves at a predetermined rate.

At Step 38, the first batter injector 86 is operated to pour a first amount of the batter layer 14 into the cavity 100 of each of the receptacle members 96. The first amount of the batter layer 14 is delivered in an amount sufficient to cover at least a substantial portion of the bottom surface 116 of each of the receptacle members 96. The total amount of the batter layer 14 that is poured into the receptacle members 96 can vary between about 10-128 grams or more, depending upon the type of multi-layered food product 10 or 10' being made. It will be appreciated that a pan release agent (e.g., baking oil, shortening, etc.) can optionally be applied to all or only a portion of the molded baking cavity 102 prior to the addition of the insert 12 or 12' and/or batter to prevent or mitigate sticking.

At Step 40, the second baking plates 92 are advanced along the second assembly line 52 to the insert feeding system 88. The insert system 88 is then activated to place a partially or fully baked insert 12 or 12' atop the first amount of the batter layer 14 already in each of the receptacle members 96. The partially or fully baked insert 12 or 12' is placed atop the first amount of the batter layer 14 so that no portion of the insert 12 or 12' comes into contact with each of the receptacle members 96. In other words, a partially or fully baked insert 12 or 12' is placed in each of the receptacle members 96 so that each insert 12 or 12' is at least partially enveloped or encapsulated by the first amount of the batter layer 14. The volume of each of the receptacle members 96 filled by the first amount of the batter layer 14 and the partially or fully baked insert 12 or 12' can be about 35-90 vol. %. (and all values and ranges therebetween) of cavity 100 of receptacle member 96.

As the second baking plates 92 continue to advance along the second assembly line 52, the second batter injector 90 is operated to pour a second amount of the batter layer 14 into each of the receptacle members 96 (Step 42). The second amount of the batter layer 14 is delivered in an amount sufficient to fill an additional 10-65% (and all values and ranges therebetween) of the cavity 100 of each of the receptacle members 96. Importantly, the second amount of the batter layer 14 is poured into each of the receptacle members 96 such that each of the partially or fully baked inserts 12 or 12' is substantially or completely enveloped by the batter layer.

As the second baking plates 92 continue to advance further along the second assembly line 52, (at Step 43) the optional topping depositor(s) 91 can then be activated to optionally deposit one or more toppings 13 (e.g., 1-4 toppings) onto or atop the batter layer 14 such that 1-100% (and all values and ranges therebetween), typically 10-100%, and more typically 50-100% of the top surface of the batter layer 14 that is exposed in cavity 110 is covered by the one or more toppings 13. Generally, about 5-100% (and all values and ranges therebetween) of the one or more toppings that are applied to the batter layer become partially or fully embedded in the batter layer prior to the baking of the batter layer, and typically about 20-100% of the one or more toppings that are applied to the batter layer become partially or fully embedded in the batter layer prior to the baking of the batter layer.

Figure 11:
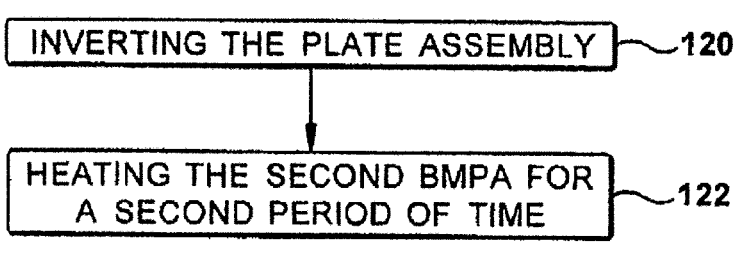
FIG. 11 is a process flow diagram illustrating a further aspect of the method shown in FIG. 4.

At Step 44, each of the second bi-molded plate assemblies 94 is arranged to form the molded baking cavity 102. For example, the second major surface 106 of each of the lid members 98 is securely mated with the first major surface 110 of each of the receptacle members 96 to form a heated and sealed molded baking cavity 102. By "sealed" it is understood that the baking cavity 102 can include holes, gaps, vents, or other apertures that permit the release of steam, $CO_2$, and other gasses from the baking cavity while preventing leakage of product components. The baking time for Step 46 can occur in one or more baking periods. If the baking time for Step 46 is a single baking period, the batter layer is baked until it is substantially or fully baked. If the baking time for Step 46 occurs in two baking periods, in the first period of time of baking, the batter is baked 5-60% of the time of fully baking the batter layer, and typically 5-49 of the time of fully baking the batter layer. After baking for the first period of time, the second baking plates 92 can be optionally rotated about the rotation members 82 (indicated by arrows) so that the second bi-molded plate assemblies 94 is inverted (Step 120) (FIG. 11). Inverting the second bi-molded plate assemblies 94 allows the batter layer 14 to distribute better within each of the molded baking cavities 102, while also facilitating more even baking throughout the multi-layered food product 10 or 10'. After optionally inverting the second baking plates 92, the second baking plates are heated for a second period of time. The second period of time can be about 40% to about 95% of the total time needed to bake the multi-layered food product 10 or 10', and typically 51-95% of the time needed to fully bake the batter layer. The second period of time is generally greater than the first period of time (Step 122). After the baking of the batter layer, the batter layer is generally baked 80-100% of fully baking the batter layer, and typically 85-100% of fully baking the batter layer. It should be understood that if the baking plates 92 are not inverted, then the entire baking process (first and second periods of time) is combined into one baking period. By baking components (e.g., all of the components) of the multi-layered food product 10 or 10' under pressure and at a uniform temperature, the dough layer 18 and the batter layer 14 and the optional topping(s) 13 can be combined to form a substantially seamless, borderless product. In one non-limiting embodiment, the batter layer 14 is fully or completely baked (i.e., 100% baked) during the baking step 46. The time required to bake the batter layer 14 and the optional topping(s) 13 is about 30-600 seconds, and typically 40-120 seconds.

At Step 48 (FIG. 4), the automatic removing system 84 separates the lid member 98 and the receptacle member 96 of each of the second bi-molded plate assemblies 94 after the multi-layered food product 10 or 10' has been sufficiently baked. Since each of the receptacle members 96 is inverted, separation of the lid members 98 from the receptacle members allows the multi-layered food product 10 or 10' to be easily removed from the second bi-molded plate assemblies 94 via gravity since the larger volume cavity is one top. Alternatively, the multi-layer food product 10 or 10' can be removed by a suction mechanism (not shown) once the bi-molded plate assemblies 94 are opened. For example, if the receptacle members 96 are not inverted during the baking process, suction can be used to remove the multi-layer food product 10 or 10' from the opened bi-molded plate assemblies 94; however, other removal processes can be used.

After removing the multi-layered food product 10 or 10' from each of the bi-molded plate assemblies 94, the multi-layered food product is cooled for an appropriate period of time before freezing, wrapping, and packaging. The packaged multi-layered food product 10 or 10' can be boxed and further frozen ahead of distribution to the marketplace.

Figure 12:
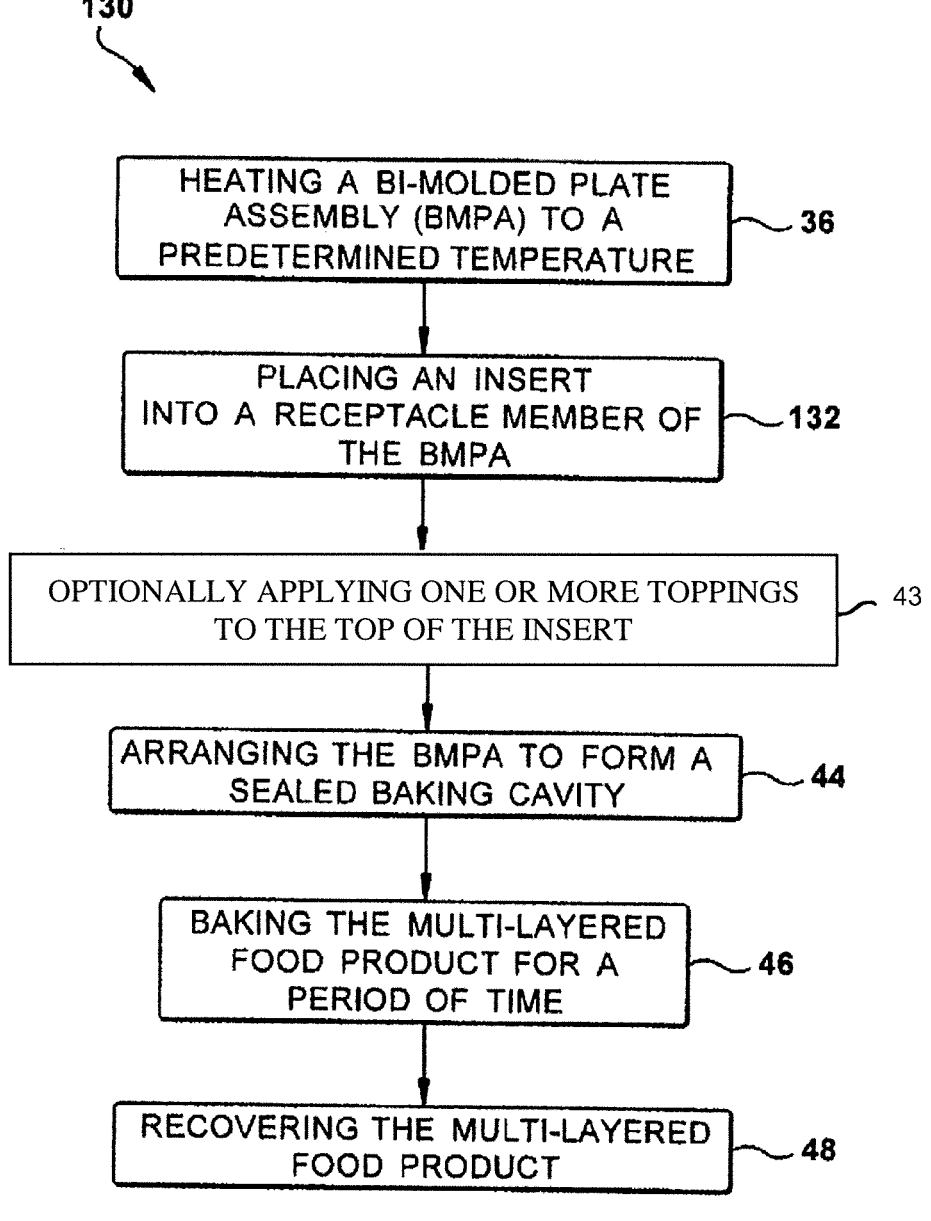
FIG. 12 is a process flow diagram illustrating a method for forming a multi-layered food product according to another aspect of the present disclosure.

As illustrated in FIG. 12, another aspect of the present disclosure includes a method 130 for forming a multi-layered food product 10". As discussed above, multi-layered food product 10" can be formed in first automated assembly line 50 or second automated assembly line 52, depending on the type of dough/batter layer used to form multi-layered food product 10". The method 130 is similar to the method 30 illustrated in FIG. 4. For example, the method 130 can be performed using an automated assembly line that is identical or similar to the first automated assembly line 50 described above. Additionally, the method 130 can be performed using bi-molded plate assemblies (not shown) that are similar to the first bi-molded plate assemblies 62 described above or bi-molded plate assemblies 94 as described above.

At Step 36, the method 130 can begin by heating the bi-molded plate assemblies to a predetermined temperature (e.g., about 300-450° F.). Either prior to, contemporaneous with, or subsequent to Step 36, the raw components of the multi-layered food product 10" can be prepared. For example, the dough 18 can be formed by scaling (e.g., measuring out) the needed ingredients (as described above). As also described above, it will be appreciated that other ingredients may be added to adjust the flavor or improve the functionality of the dough 18. Additionally, the filling layer 16 and the optional topping(s) layer 13 ingredients are prepared.

After the ingredients are scaled, the ingredients can be mixed and kneaded together for a period of time. When the dough 18 is a yeast-leavened dough, the ingredients are mixed and kneaded together for a period of time sufficient to develop the gluten structure of the yeast-leavened dough 18. Next, a measured amount of one or more fillings 16 can be "encrusted" inside a measured amount of the dough 18 using a known bakery machining process. In one non-limiting embodiment, the measured amount of filling 16 can be about 15-99 grams, and the measured amount of the dough 18 can be about 12-128 grams. After the filling 16 is encrusted inside the dough 18, the formed product comprises a ball-shaped insert 12" that is substantially or completely enveloped or encapsulated by the dough and includes the filling at its center.

The insert 12" can optionally be passed through a molding or shaping device (not shown) so that upper and lower portions of the insert are partially flattened. The molded insert 12" is then placed into a bakery proofing chamber 118 for a period of time sufficient to adequately "rise" or "proof" the insert prior to baking. For example, the proofing time can vary from about 10-60 minutes, depending upon the type and size of the dough 18 and the filling 16. After the insert 12" is adequately proofed, it is ready for subsequent use.

Upon heating each of the bi-molded plate assemblies to the predetermined temperature and forming the raw components of the multi-layered food product 10", the insert 12" can be placed into a receptacle member of a bi-molded plate assembly (Step 132). At Step 43, optionally one or more toppings 13 can be sprinkled or poured atop the insert 12" before the lid member is mated with the receptacle member to form a sealed baking cavity (Step 44). The one or more optional toppings 13 typically cover about 50-100% of the top half of insert 12" prior to closing the lid member and baking and forming the food product 10" as illustrated in FIGS. 3A-3D.

Following formation of the sealed baking cavity, the insert 12" can be partially or fully baked at Step 46. As described above, an insert 12" is taken from the proofing chamber 118 and deposited into the receptacle member of a bi-molded plate assembly. It will be appreciated that the insert 12" can be deposited into the receptacle member by any one or combination of mechanisms known in the art, such as via a robotic arm, conveyor belt system 140 (FIG. 6), or by hand. Once the insert 12" is deposited into the receptacle member and the optional topping(s) 13 are deposited atop insert 12", the receptacle members and the lid members move about the tracts of an oven 58 (e.g., a tunnel oven) to securely mate with another and thereby form a plurality of bi-molded plate assemblies.

The bi-molded plate assemblies then move through the oven 58 for a time and at a temperature sufficient to partially or fully bake the insert 12" and the optional topping(s) 13. For example, the bi-molded plate assemblies can move through oven 58 so that the insert 12" and the topping(s) are baked to completion (100% baked). For instance, the first bi-molded plate assemblies can move through the oven 58 for a time of about 1-4 minutes and at a temperature of about 300-450° F. to completely bake the insert 12" and the optional topping(s) 13.

After the bi-molded plate assemblies pass through the oven 58, the receptacle members and the lid members are separated as shown in FIG. 5 so that the multi-layered food product 10" can be removed from the plates and cooled for an appropriate period of time before freezing, wrapping, and packaging. The packaged multi-layered food product 10" can be boxed and further frozen ahead of distribution to the marketplace.

Figure 13:
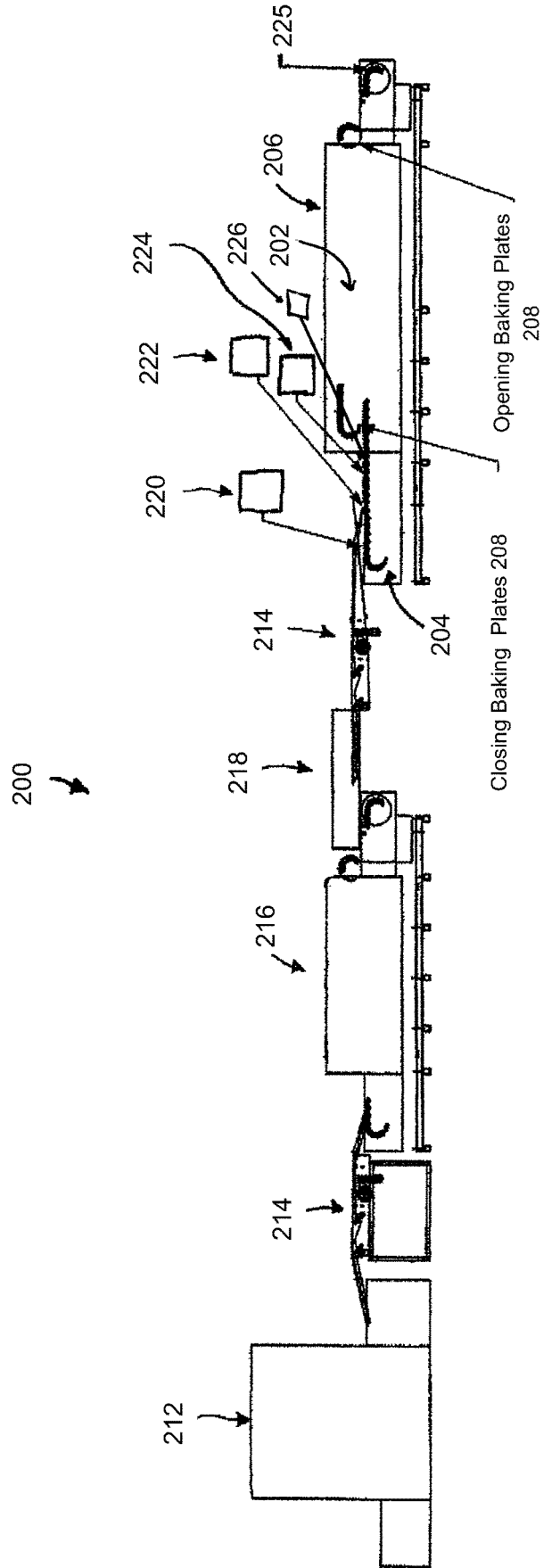
FIG. 13 is a schematic diagram showing an alternative configuration of the automated assembly line system in FIG. 6.

It will be appreciated that the present disclosure can include an alternative assembly line system 200 (FIG. 13) for forming a multi-layered food product 10 or 10'. As illustrated in FIG. 13, the assembly line system 200 includes a series of upper and lower loop-shaped tracts 202 and 204, a portion of each of which is disposed within an oven 206. The upper and lower tracts 202 and 204 include a plurality of baking plates 208 (not shown in detail) securely mounted thereto that can be mated together to form a plurality of bi-molded plate assemblies (not shown) (as described above). The lower tract 204 has a greater length than the upper tract 202, which allows the components of the multi-layered food product 10 or 10' to be supplied to the baking plates 208 as shown in FIG. 13. Other components of the assembly line system 200 are similar or identical to those shown in FIG. 6 and described above, such as a bakery proofing chamber 212, a conveyor belt system 214, a second oven 216, a transfer machine 218, a first batter injector 220, an insert feeding system 222, a second batter injector 224, an optional topping device 226, and an optional automatic removing system 225. For example, the oven 206 is different from the oven 52 described above because there is no inversion or flipping of plates during operation.

In operation, the baking plates are heated to a predetermined temperature (as described above). The first batter injector 220 is operated to pour a first amount of a batter layer 14 into each of the baking plates 208. The baking plates 208 are then advanced along the lower tract 204 (e.g., clockwise) to the insert feeding system 222, which is activated to place a substantially baked insert 12 or 12' atop the first amount of the batter layer 14 already in each of the baking plates 208. As the baking plates 208 continue to advance along the lower tract 204, the second batter injector 224 is operated to pour a second amount of the batter layer 14 into each of the baking plates (as described above), and the optional topping device 226 is then activated to sprinkle one or more toppings 13 atop the second batter deposit. Once the second amount of the batter layer 14 is deposited into each of the baking plates 208, as is the optional one or more toppings layers 13, the baking plates of the upper tract 202 rotate (e.g., counter-clockwise) to securely mate with the baking plates of the lower tract 204, thereby forming the plurality of bi-molded plate assemblies. When one or more toppings are applied to the top surface of the second amount of the batter layer 14, about 5-100% of the toppings are partially or fully embedded in the batter layer 14 prior to the baking of the batter layer.

Next, the bi-molded plate assemblies move through the oven 206 for a time and at a temperature sufficient to substantially or completely bake the multi-layered food product 10 or 10' (as described above). The total bake time is about 30-300 seconds. After the bi-molded plate assemblies pass through the oven 206, the baking plates of the lower and upper tracts 204 and 202 are separated so that the partially or fully baked multi-layered food product 10 or 10' is removed from each of the bi-molded plate assemblies (e.g., by gravity or an automatic removing system 225) and cooled for an appropriate period of time before freezing, wrapping, and packaging. The packaged multi-layered food product 10 or 10' can be boxed and further frozen ahead of distribution to the marketplace.

Consumers of the multi-layered food products 10, 10' or 10" can reheat or prepare the frozen product by microwave, oven, toaster, or by a combination of a microwave and a toaster or toaster oven. The frozen multi-layered food product can be heated by a microwave for a period of time (e.g., 10-80 seconds (depending on microwave strength)) and then optionally toasted for a period of (20-250 seconds on a low-medium setting).

It will thus be seen that the objects set forth above, among those made apparent from the preceding description, are efficiently attained, and since certain changes may be made in the constructions set forth without departing from the spirit and scope of the disclosure, it is intended that all matter contained in the above description and shown in the accompanying drawings shall be interpreted as illustrative and not in a limiting sense. The disclosure has been described with reference to preferred and alternate embodiments. Modifications and alterations will become apparent to those skilled in the art upon reading and understanding the detailed discussion of the disclosure provided herein. This disclosure is intended to include all such modifications and alterations insofar as they come within the scope of the present disclosure. It is also to be understood that the following claims are intended to cover all of the generic and specific features of the disclosure herein described and all statements of the scope of the disclosure, which, as a matter of language, might be said to fall therebetween.

What is claimed:

1. A method for forming a plurality of filled food products on an automated assembly line system; said method comprising the steps of:
   a. providing a food insert; said food insert includes a filling and a dough layer; said dough layer encapsulates at least 80% of said filling; a composition of said filling and dough layer is different;
   b. providing an automated assembly line; said automated assembly line including I) a plurality of plate assemblies, II) a drive arrangement to cause said plurality of plate assemblies to continuously move through various regions of said automated assembly line, III) an automated food insert feeder arrangement, IV) an automated mating arrangement, V) a preheat heating system, and VI) an oven system; each of said plate assemblies includes a first plate and a second plate; said first plate includes a depression that is configured to at least partially receive said food insert; said second plate is configured to be inserted over said first plate to form a closed cavity that at least partially encapsulates said food insert when said food insert is positioned in said closed cavity;
   c. continuously moving each of said plate assemblies into said preheat heating system to heat said plate assemblies to a predetermined temperature;
   d. causing said automated food insert feeder arrangement to place said food insert into said depression in said first plate of each of said plate assemblies after said plate assembly has been heated to said predetermined temperature;
   e. moving said plurality of said plate assemblies by said drive arrangement into said oven system;
   f. baking said food insert in each of said plate assemblies for a period of time as said plate assemblies are moved by said drive arrangement through said oven system to form a baked food insert;
   g. causing said automating mating arrangement to mate said second plate with said first plate of each of said plate assemblies while said plate assemblies are moved through said automated assembly line assembly so that said food insert in each of said plate assemblies is at least partially encapsulated in said closed cavity during at least a portion of time said food insert is moved through said oven system;
   h. moving said plurality of plate assemblies by said drive arrangement so as to cause said plurality of plate assemblies to be removed from said oven system after said period of time;
   i causing said first and second plates to move away from one another to open said cavity after at least partially baking of said food insert while in said closed cavity; and

j. causing said baked food insert in each of said cavities of said plate assemblies to be automatically removed from said plate assembly after said first and second plates have been separated.

2. The method as defined in claim 1, further including the step of inverting each of said plate assemblies during the movement of said plate assemblies through said oven system while said second plate is mated with said first plate.

3. The method as defined in claim 2, wherein said automating mating arrangement causes said mated first and second plates to move away from one another to open said cavity after said first and second plates have exited said oven.

4. The method as defined in claim 3, further including the step of a1) proofing said food insert prior to said food insert being inserted into said depression of said first plate, and/or b1) baking said food insert at least 10% of full baking of said dough layer prior to said food insert being inserted into said depression of said first plate.

5. The method as defined in claim 4, further including the step of inserting one or more toppings on said food insert; said topping having a different composition from said filling and said dough layer.

6. The method as defined in claim 5, further including the step of pouring a leavened batter into said depression in said first plate of each of said plate assemblies that include said food insert; said dough layer and said filling having a different composition from said leavened batter.

7. The method as defined in claim 6, wherein said the step of inverting said plate assemblies during the movement of said plate assemblies through said oven system occurs after said leavened batter has been poured into said depression in said first plate.

8. The method as defined in claim 4, further including the step of pouring a leavened batter into said depression in said first plate of each of said plate assemblies that include said food insert; said dough layer and said filling having a different composition from said leavened batter.

9. The method as defined in claim 8, wherein said the step of inverting said plate assemblies during the movement of said plate assemblies through said oven system occurs after said leavened batter has been poured into said depression in said first plate.

10. The method as defined in claim 3, further including the step of pouring a leavened batter into said depression in said first plate of each of said plate assemblies that include said food insert; said dough layer and said filling having a different composition from said leavened batter.

11. The method as defined in claim 10, wherein said the step of inverting said plate assemblies during the movement of said plate assemblies through said oven system occurs after said leavened batter has been poured into said depression in said first plate.

12. The method as defined in claim 2, further including the step of pouring a leavened batter into said depression in said first plate of each of said plate assemblies that include said food insert; said dough layer and said filling having a different composition from said leavened batter.

13. The method as defined in claim 12, wherein said the step of inverting said plate assemblies during the movement of said plate assemblies through said oven system occurs after said leavened batter has been poured into said depression in said first plate.

14. The method as defined in claim 1, wherein said automating mating arrangement causes said mated first and second plates to move away from one another to open said cavity after said first and second plates have exited said oven.

15. The method as defined in claim 14, further including the step of pouring a leavened batter into said depression in said first plate of each of said plate assemblies that include said food insert; said dough layer and said filling having a different composition from said leavened batter.

16. The method as defined in claim 1, further including the step of a1) proofing said food insert prior to said food insert being inserted into said depression of said first plate, and/or b1) baking said food insert at least 10% of full baking of said dough layer prior to said food insert being inserted into said depression of said first plate.

17. The method as defined in claim 16, further including the step of pouring a leavened batter into said depression in said first plate of each of said plate assemblies that include said food insert; said dough layer and said filling having a different composition from said leavened batter.

18. The method as defined in claim 1, further including the step of inserting one or more toppings on said food insert; said topping having a different composition from said filling and said dough layer.

19. The method as defined in claim 18, further including the step of pouring a leavened batter into said depression in said first plate of each of said plate assemblies that include said food insert; said dough layer and said filling having a different composition from said leavened batter.

20. The method as defined in claim 1, further including the step of pouring a leavened batter into said depression in said first plate of each of said plate assemblies that include said food insert; said dough layer and said filling having a different composition from said leavened batter.

21. A method for forming a plurality of filled food products on an automated assembly line system; said method comprising the steps of:

a. providing a food insert; said food insert includes a filling and a dough layer; said dough layer encapsulates at least 80% of said filling; a composition of said filling and dough layer is different;

b. providing an automated assembly line; said automated assembly line including I) a plurality of plate assemblies, II) a drive arrangement to cause said plurality of plate assemblies to continuously move through various regions of said automated assembly line, III) an automated food insert feeder arrangement, IV) an automated mating arrangement, V) a preheat heating system, VI) a proofing system, and VII an oven system; each of said plate assemblies includes a first plate and a second plate; said first plate includes a depression that is configured to at least partially receive said food insert; said second plate is configured to be inserted over said first plate to form a closed cavity that at least partially encapsulates said food insert when said food insert is positioned in said closed cavity;

c. continuously moving each of said plate assemblies into said preheat heating system to heat said plate assemblies to a predetermined temperature;

d. moving said food insert through said proofing system to proof said dough layer of said food insert;

e. causing said automated food insert feeder arrangement to remove said food insert from said proofing system and to place said food insert into said depression in said first plate of each of said plate assemblies after said plate assembly has been heated to said predetermined temperature;

f. moving said plurality of said plate assemblies by said drive arrangement into said oven system;

g. baking said food insert in each of said plate assemblies for a period of time as said plate assemblies are moved by said drive arrangement through said oven system to form a baked food insert;

h. causing said automating mating arrangement to mate said second plate with said first plate of each of said plate assemblies while said plate assemblies are moved through said automated assembly line assembly so that said food insert in each of said plate assemblies is at least partially encapsulated in said closed cavity during at least a portion of time said food insert is moved through said oven system;

i. moving said plurality of plate assemblies by said drive arrangement so as to cause said plurality of plate assemblies to be removed from said oven system after said period of time;

j. causing said first and second plates to move away from one another to open said cavity after at least partially baking of said food insert while in said closed cavity; and k. causing said baked food insert in each of said cavities of said plate assemblies to be automatically removed from said plate assembly after said first and second plates have been separated.

22. The method as defined in claim 21, further including the step of inverting each of said plate assemblies during the movement of said plate assemblies through said oven system while said second plate is mated with said first plate.

23. The method as defined in claim 22, wherein said automating mating arrangement causes said mated first and second plates to move away from one another to open said cavity as said plate assemblies are moved through said automated assembly line assembly.

24. The method as defined in claim 23, further including the step of inserting one or more toppings on said food insert; said topping having a different composition from said filling and said dough layer.

25. The method as defined in claim 24, further including the step of pouring a leavened batter into said depression in said first plate of each of said plate assemblies that include said food insert; said dough layer and said filling having a different composition from said leavened batter.

26. The method as defined in claim 25, wherein said step of inverting said plate assemblies during the movement of said plate assemblies through said oven system occurs after said leavened batter has been poured into said depression in said first plate.

27. The method as defined in claim 23, further including the step of pouring a leavened batter into said depression in said first plate of each of said plate assemblies that include said food insert; said dough layer and said filling having a different composition from said leavened batter.

28. The method as defined in claim 27, wherein said step of inverting said plate assemblies during the movement of said plate assemblies through said oven system occurs after said leavened batter has been poured into said depression in said first plate.

29. The method as defined in claim 22, further including the step of pouring a leavened batter into said depression in said first plate of each of said plate assemblies that include said food insert; said dough layer and said filling having a different composition from said leavened batter.

30. The method as defined in claim 29, wherein said step of inverting said plate assemblies during the movement of said plate assemblies through said oven system occurs after said leavened batter has been poured into said depression in said first plate.

31. The method as defined in claim 21, wherein said automating mating arrangement causes said mated first and second plates to move away from one another to open said cavity after said first and second plates have exited said oven.

32. The method as defined in claim 31, further including the step of pouring a leavened batter into said depression in said first plate of each of said plate assemblies that include said food insert; said dough layer and said filling having a different composition from said leavened batter.

33. The method as defined in claim 21, further including the step of inserting one or more toppings on said food insert; said topping having a different composition from said filling and said dough layer.

34. The method as defined in claim 33, further including the step of pouring a leavened batter into said depression in said first plate of each of said plate assemblies that include said food insert; said dough layer and said filling having a different composition from said leavened batter.

35. The method as defined in claim 21, further including the step of pouring a leavened batter into said depression in said first plate of each of said plate assemblies that include said food insert; said dough layer and said filling having a different composition from said leavened batter.

36. A method for forming a plurality of filled food products on an automated assembly line system; said method comprising the steps of:

a. providing a food insert; said food insert includes a filling and a dough layer; said dough layer encapsulates at least 80% of said filling; a composition of said filling and dough layer is different;

b. providing an automated assembly line; said automated assembly line including I) a plurality of plate assemblies, II) a drive arrangement to cause said plurality of plate assemblies to continuously move through various regions of said automated assembly line, III) an automated food insert feeder arrangement, IV) an automated mating arrangement, and V) an oven system; each of said plate assemblies includes a first plate and a second plate; said first plate includes a depression that is configured to at least partially receive said food insert; said second plate is configured to be inserted over said first plate to form a closed cavity that at least partially encapsulates said food insert when said food insert is positioned in said closed cavity;

c. causing said automated food insert feeder arrangement to place said food insert into said depression in said first plate of each of said plate assemblies;

d. moving said plurality of said plate assemblies by said drive arrangement into said oven system;

e. baking said food insert in each of said plate assemblies for a period of time as said plate assemblies are moved by said drive arrangement through said oven system to form a baked food insert;

f. causing said automating mating arrangement to mate said second plate with said first plate of each of said plate assemblies while said plate assemblies are moved through said automated assembly line assembly so that said food insert in each of said plate assemblies is at least partially encapsulated in said closed cavity during at least a portion of time said food insert is moved through said oven system;

g. moving said plurality of plate assemblies by said drive arrangement so as to cause said plurality of plate assemblies to be removed from said oven system after said period of time;

h. causing said first and second plates to move away from one another to open said cavity after at least partially baking of said food insert while in said closed cavity; and i. causing said baked food insert in each of said cavities of said plate assemblies to be automatically removed from said plate assembly after said first and second plates have been separated.

37. The method as defined in claim 36, further including the step of inverting each of said plate assemblies during the movement of said plate assemblies through said oven system while said second plate is mated with said first plate.

38. The method as defined in claim 37, wherein said automating mating arrangement causes said mated first and second plates to move away from one another to open said cavity after said first and second plates have exited said oven.

39. The method as defined in claim 38, further including the step of inserting one or more toppings on said food insert; said topping having a different composition from said filling and said dough layer.

40. The method as defined in claim 39, further including the step of pouring a leavened batter into said depression in said first plate of each of said plate assemblies that include said food insert; said dough layer and said filling having a different composition from said leavened batter.

41. The method as defined in claim 40, further including the step of:

I) providing a preheat heating system that is configured to preheat said first plate and/or said second plate prior to said first and/or second plate moving into said oven system, and/or II) providing a proof system that is configured to at least partially proof said food insert prior said food insert being fully baked.

42. The method as defined in claim 38, further including the step of pouring a leavened batter into said depression in said first plate of each of said plate assemblies that include said food insert; said dough layer and said filling having a different composition from said leavened batter.

43. The method as defined in claim 42, further including the step of:

I) providing a preheat heating system that is configured to preheat said first plate and/or said second plate prior to said first and/or second plate moving into said oven system, and/or II) providing a proof system that is configured to at least partially proof said food insert prior said food insert being fully baked.

44. The method as defined in claim 37, further including the step of pouring a leavened batter into said depression in said first plate of each of said plate assemblies that include said food insert; said dough layer and said filling having a different composition from said leavened batter.

45. The method as defined in claim 44, further including the step of:

I) providing a preheat heating system that is configured to preheat said first plate and/or said second plate prior to said first and/or second plate moving into said oven system, and/or II) providing a proof system that is configured to at least partially proof said food insert prior said food insert being fully baked.

46. The method as defined in claim 36, wherein said automating mating arrangement causes said mated first and second plates to move away from one another to open said cavity after said first and second plates have exited said oven.

47. The method as defined in claim 46, further including the step of pouring a leavened batter into said depression in said first plate of each of said plate assemblies that include said food insert; said dough layer and said filling having a different composition from said leavened batter.

48. The method as defined in claim 47, further including the step of:

I) providing a preheat heating system that is configured to preheat said first plate and/or said second plate prior to said first and/or second plate moving into said oven system, and/or II) providing a proof system that is configured to at least partially proof said food insert prior said food insert being fully baked.

49. The method as defined in claim 36, further including the step of inserting one or more toppings on said food insert; said topping having a different composition from said filling and said dough layer.

50. The method as defined in claim 49, further including the step of pouring a leavened batter into said depression in said first plate of each of said plate assemblies that include said food insert; said dough layer and said filling having a different composition from said leavened batter.

51. The method as defined in claim 50, further including the step of:

I) providing a preheat heating system that is configured to preheat said first plate and/or said second plate prior to said first and/or second plate moving into said oven system, and/or II) providing a proof system that is configured to at least partially proof said food insert prior said food insert being fully baked.

52. The method as defined in claim 36, further including the step of pouring a leavened batter into said depression in said first plate of each of said plate assemblies that include said food insert; said dough layer and said filling having a different composition from said leavened batter.

53. The method as defined in claim 52, further including the step of:

I) providing a preheat heating system that is configured to preheat said first plate and/or said second plate prior to said first and/or second plate moving into said oven system, and/or II) providing a proof system that is configured to at least partially proof said food insert prior said food insert being fully baked.

54. The method as defined in claim 36, further including the step of:

I) providing a preheat heating system that is configured to preheat said first plate and/or said second plate prior to said first and/or second plate moving into said oven system, and/or II) providing a proof system that is configured to at least partially proof said food insert prior said food insert being fully baked.

* * * * *